(12) United States Patent
Oh et al.

(10) Patent No.: US 10,402,146 B2
(45) Date of Patent: Sep. 3, 2019

(54) MOBILE TERMINAL AND OPERATING METHOD THEREOF

(71) Applicant: LG ELECTRONICS INC., Seoul (KR)

(72) Inventors: Hyojung Oh, Seoul (KR); Seunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 179 days.

(21) Appl. No.: 15/253,218

(22) Filed: Aug. 31, 2016

(65) Prior Publication Data

US 2017/0220311 A1 Aug. 3, 2017

(30) Foreign Application Priority Data

Jan. 28, 2016 (KR) .................. 10-2016-0010955

(51) Int. Cl.
*G06F 3/14* (2006.01)
*G06F 3/0484* (2013.01)
*H04N 21/41* (2011.01)
*H04L 29/06* (2006.01)
*H04N 21/422* (2011.01)
*H04N 21/43* (2011.01)
*H04N 21/4363* (2011.01)
*H04N 21/485* (2011.01)
*H04L 29/08* (2006.01)

(52) U.S. Cl.
CPC ........ *G06F 3/1454* (2013.01); *G06F 3/04847* (2013.01); *H04L 65/1083* (2013.01); *H04L 65/601* (2013.01); *H04L 67/18* (2013.01); *H04N 21/4122* (2013.01); *H04N 21/4126* (2013.01); *H04N 21/42204* (2013.01); *H04N 21/4302* (2013.01); *H04N 21/43637* (2013.01); *H04N 21/485* (2013.01); *G09G 2340/0492* (2013.01); *G09G 2370/027* (2013.01)

(58) Field of Classification Search
CPC ..................................... G06F 3/14; G06F 3/17
USPC .......... 715/718, 769, 784; 345/2.2; 709/228; 370/312
See application file for complete search history.

(56) References Cited

U.S. PATENT DOCUMENTS

| | | | |
|---|---|---|---|
| 8,565,819 B2 | 10/2013 | Zhang et al. | |
| 2005/0091610 A1 | 4/2005 | Frei et al. | |
| 2012/0040720 A1 | 2/2012 | Zhang et al. | |
| 2012/0054671 A1* | 3/2012 | Thompson | G06F 3/038 715/784 |

(Continued)

FOREIGN PATENT DOCUMENTS

| | | |
|---|---|---|
| CN | 103155692 A | 6/2013 |
| CN | 104238986 A | 12/2014 |

(Continued)

*Primary Examiner* — Ruay Ho
(74) *Attorney, Agent, or Firm* — Birch, Stewart, Kolasch & Birch, LLP

(57) ABSTRACT

A mobile terminal includes: a display unit configured to display information; a short-range communication module configured to transmit information on a screen of the display unit to a display device in order to perform a screen mirroring function; and a control unit configured to control the display unit and the short-range communication module, wherein the control unit controls the screen mirroring function based on a type of a screen that the mobile terminal displays.

9 Claims, 20 Drawing Sheets

(56) References Cited

U.S. PATENT DOCUMENTS

| | | |
|---|---|---|
| 2013/0094423 A1* | 4/2013 | Wengrovitz ........ H04L 12/1836 370/312 |
| 2013/0219072 A1 | 8/2013 | Han et al. |
| 2014/0125554 A1* | 5/2014 | Pan ........................... G06T 3/40 345/2.2 |
| 2015/0032686 A1 | 1/2015 | Kuchoor |
| 2015/0169141 A1* | 6/2015 | Kim ...................... G06F 3/0482 715/769 |
| 2015/0222709 A1* | 8/2015 | Thielen ................. H04L 67/327 709/228 |
| 2017/0308349 A1 | 10/2017 | He et al. |

FOREIGN PATENT DOCUMENTS

| | | |
|---|---|---|
| CN | 104317620 A | 1/2015 |
| EP | 2760177 A1 | 7/2014 |

\* cited by examiner

FIG. 8B
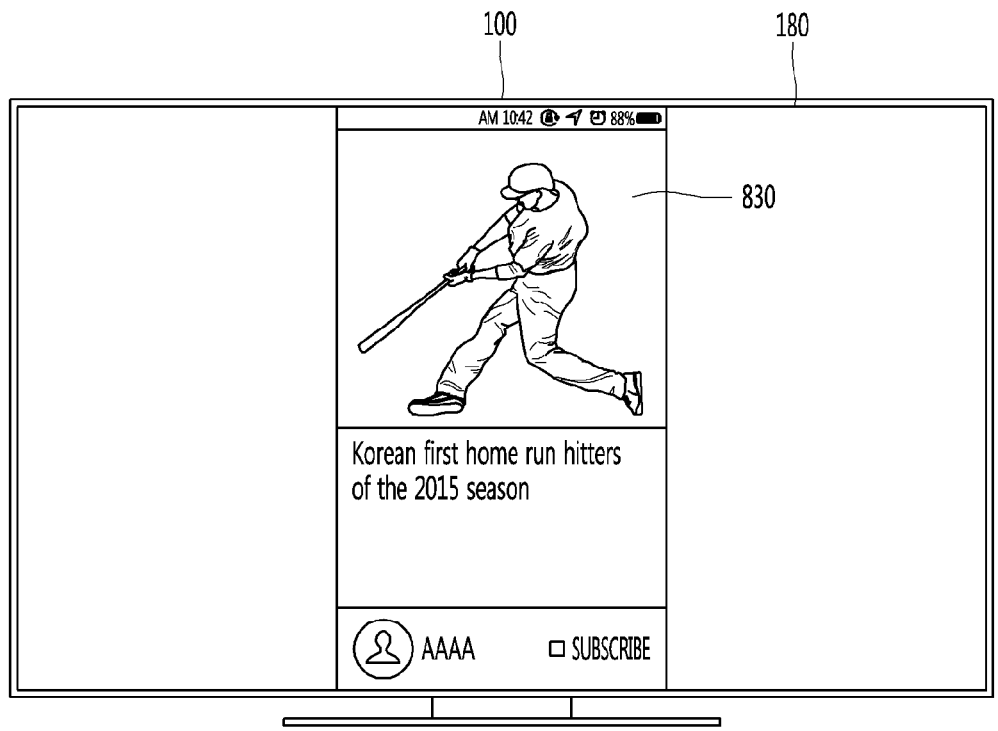
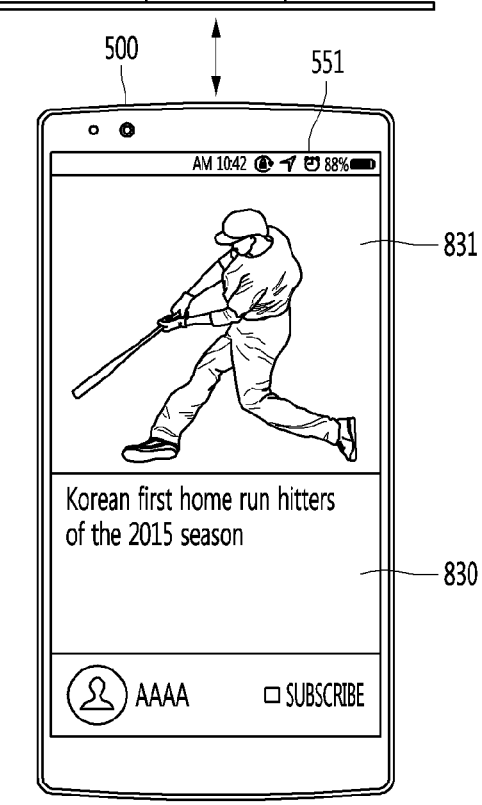

MOBILE TERMINAL AND OPERATING METHOD THEREOF

CROSS-REFERENCE TO RELATED APPLICATIONS

The present application claims priority under 35 U.S.C. 119 and 35 U.S.C. 365 to Korean Patent Application No. 10-2016-0010955 (filed on Jan. 28, 2016), which is hereby incorporated by reference in its entirety.

BACKGROUND

The present disclosure relates to a mobile terminal and an operating method thereof, and particularly, to controlling a screen mirroring function based on information that a mobile terminal displays if performing the screen mirroring function.

Digital TV services using wired or wireless communication networks are becoming common. The digital TV services may provide various services that conventional analog broadcasting services cannot provide.

For example, Internet Protocol Television (IPTV) and smart TV services, that is, types of digital TV services, provide interactivity that allows users to actively select the types, watching times, and so on of watching programs. The IPTV and smart TV services may provide various additional services, for example, internet search, home shopping, and online game, based on such interactivity.

Additionally, recently, information outputted from a terminal connected to a TV may be provided through the screen of the TV. Among them, a screen mirroring function for displaying the screen of a terminal connected to a TV as it is used greatly.

However, conventionally, as a display device displays a screen of a terminal connected to a TV during the performance of a screen mirroring function, the screen mirroring function may be performed on information that a user does not want. Accordingly, the battery of the mobile terminal is wasted.

SUMMARY

Embodiments provide a mobile terminal for controlling a screen mirroring function based on the type of a screen displayed on a display unit of the mobile terminal and an operating method thereto.

Embodiments also provide a mobile terminal for allowing a user's view by screen-mirroring only information that the user wants and an operating method thereof.

In one embodiment, a mobile terminal includes: a display unit configured to display information; a short-range communication module configured to transmit information on a screen of the display unit to a display device in order to perform a screen mirroring function; and a control unit configured to control the display unit and the short-range communication module, wherein the control unit controls the screen mirroring function based on a type of a screen that the mobile terminal displays.

If a mirroring mode of the mobile terminal is set to a private mirroring mode and a screen displayed on the display unit is a media content playback screen that plays a media content, the control unit may transmit the media content to the display device.

If the media content playback screen is not displayed on the display unit, the control unit may not transmit the media content to the display device.

If a home screen of the mobile terminal or an execution screen of an application that does not play the media content is displayed on the display unit, the control unit may not transmit the information on the screen to the display device.

The media content playback screen may be a screen that plays the media content on an entire screen of the display unit.

If a mirroring mode of the mobile terminal is set to a full mirroring mode, the control unit may transmit the information on the screen to the display device regardless of a type of the screen.

The control unit may transmit the media content to the display device based on a type of a media content displayed on a screen of the display unit.

Based on an application displayed on the screen of the display unit, the control unit may transmit information on an execution screen of the application to the display device.

The control unit displays a mirroring setting screen on the display unit, the mirroring setting screen includes a mirroring mode setting item for setting whether to perform the screen mirroring function based on the type of the screen that the display unit the mobile terminal 500 displays.

If the mirroring mode setting item is selected, the control unit displays a pop-up window including a full mirroring mode item for selecting a full mirroring mode and a private mirroring mode item for selecting a private mirroring mode.

In another embodiment, provided is an operating method of a mobile terminal that performs a screen mirroring function with a display device. The method includes: displaying a screen through a display unit; and controlling the screen mirroring function based on a type of the displayed screen.

The details of one or more embodiments are set forth in the accompanying drawings and the description below. Other features will be apparent from the description and drawings, and from the claims.

BRIEF DESCRIPTION OF THE DRAWINGS

FIGS. 8A to 8C are views illustrating a process that a display device and a mobile terminal perform a screen mirroring function under a total mirroring mode according to an embodiment of the present invention.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can b used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
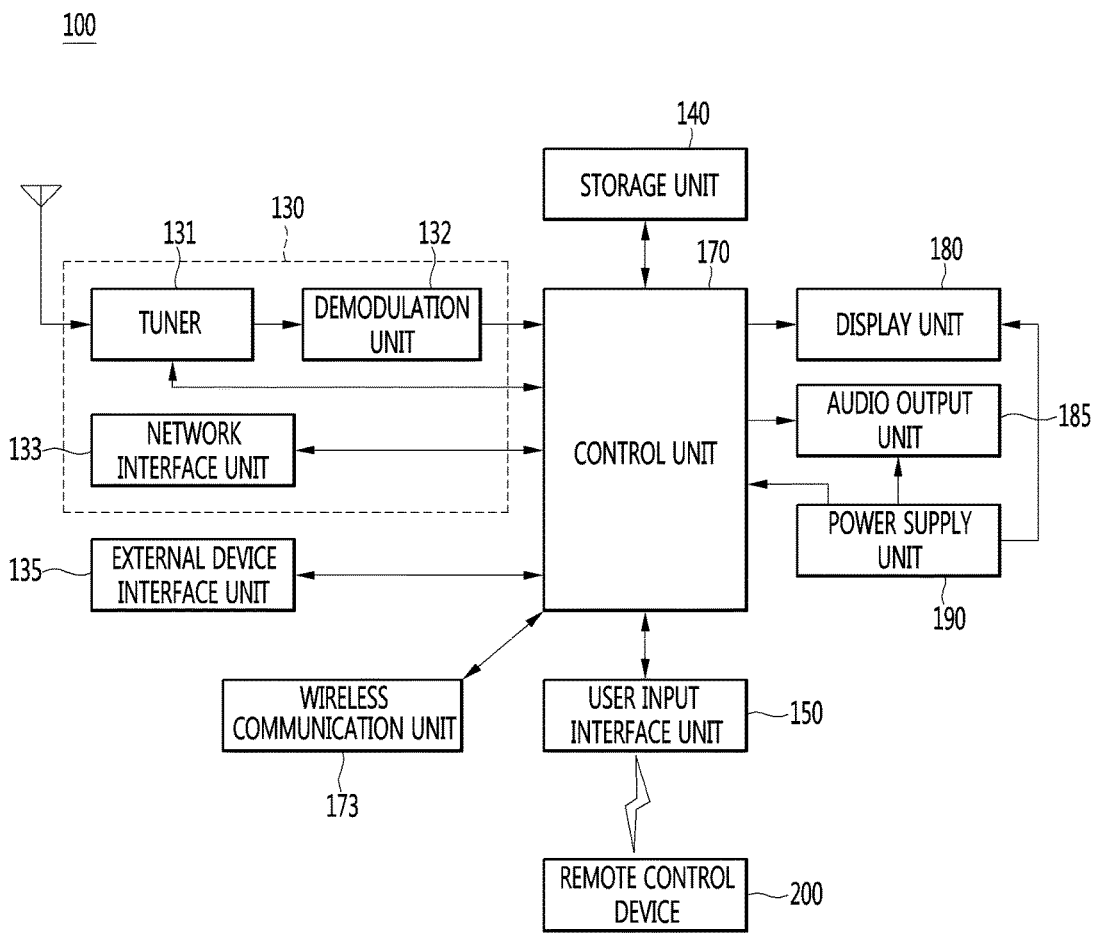
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 590.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image and audio outputted from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be outputted through the display unit 180. A sound signal of an external device inputted through the external device interface unit 135 can be outputted through the audio output unit 185.

An external device connectable to the external device interface unit 130 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals outputted from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be outputted to the audio output unit 185. Additionally, voice signals processed in the control unit 170 can be inputted to an external output device through the external device interface unit 135.

Besides that, the control module 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
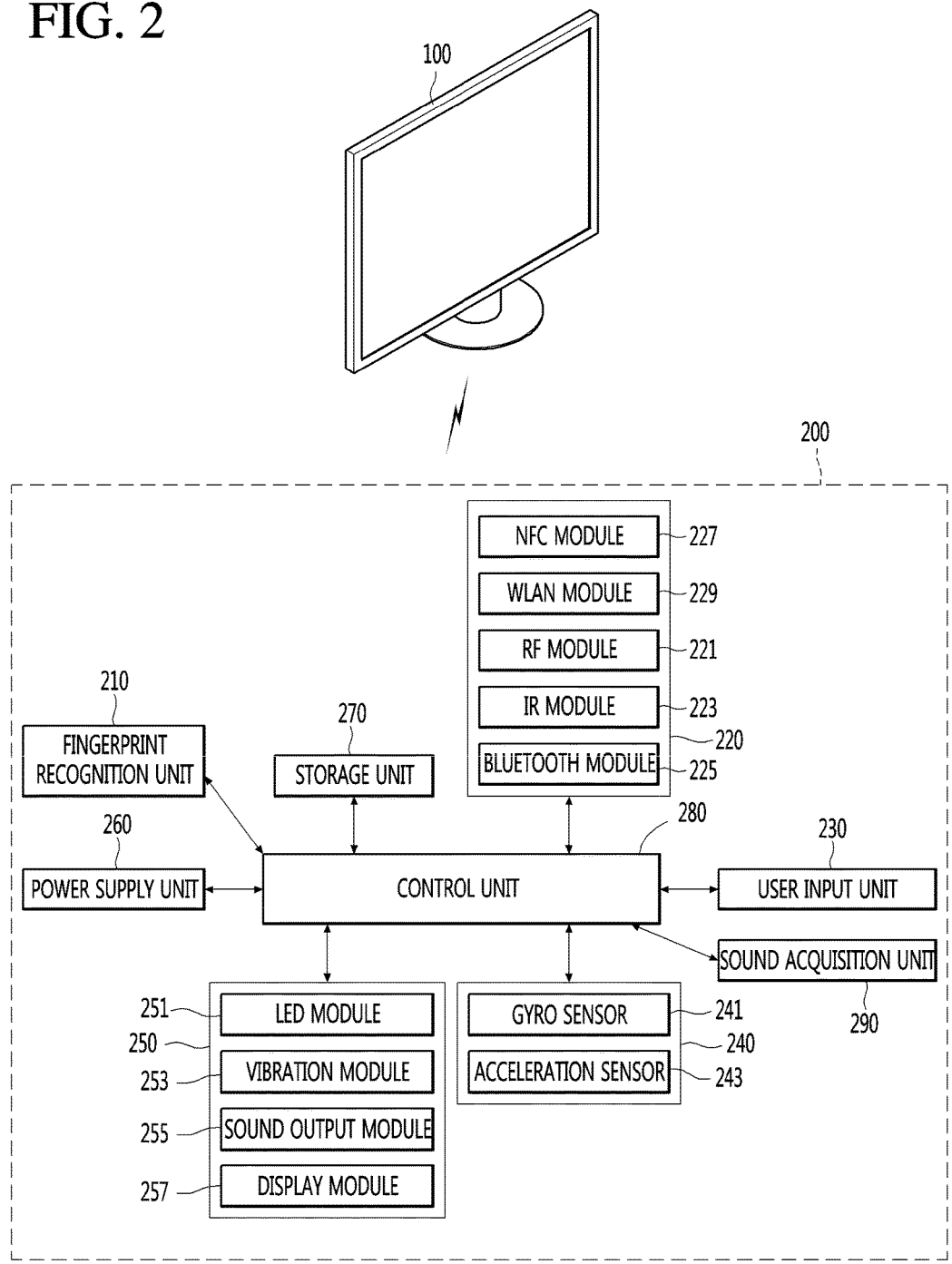
FIG. 2 is a block diagram illustrating a remote control device according to an embodiment of the present invention.
Figure 3:
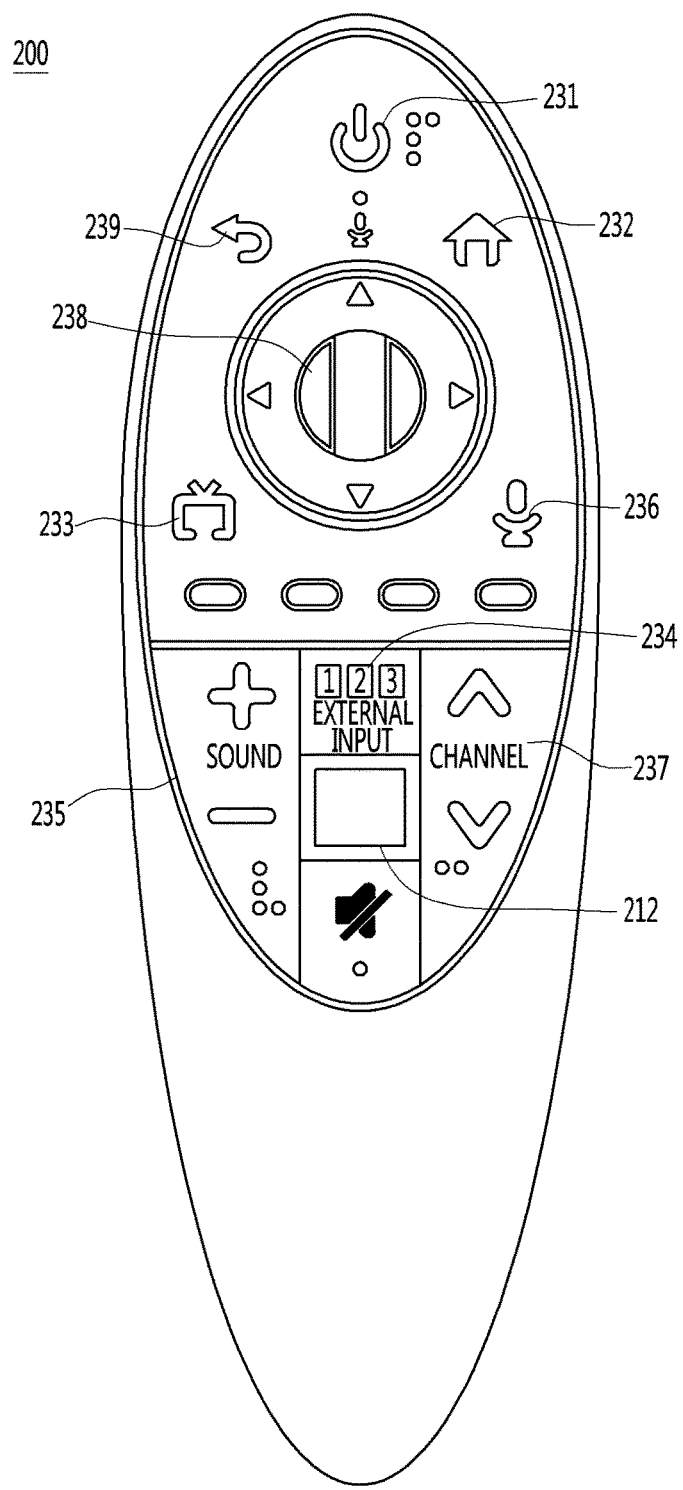
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 based on x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
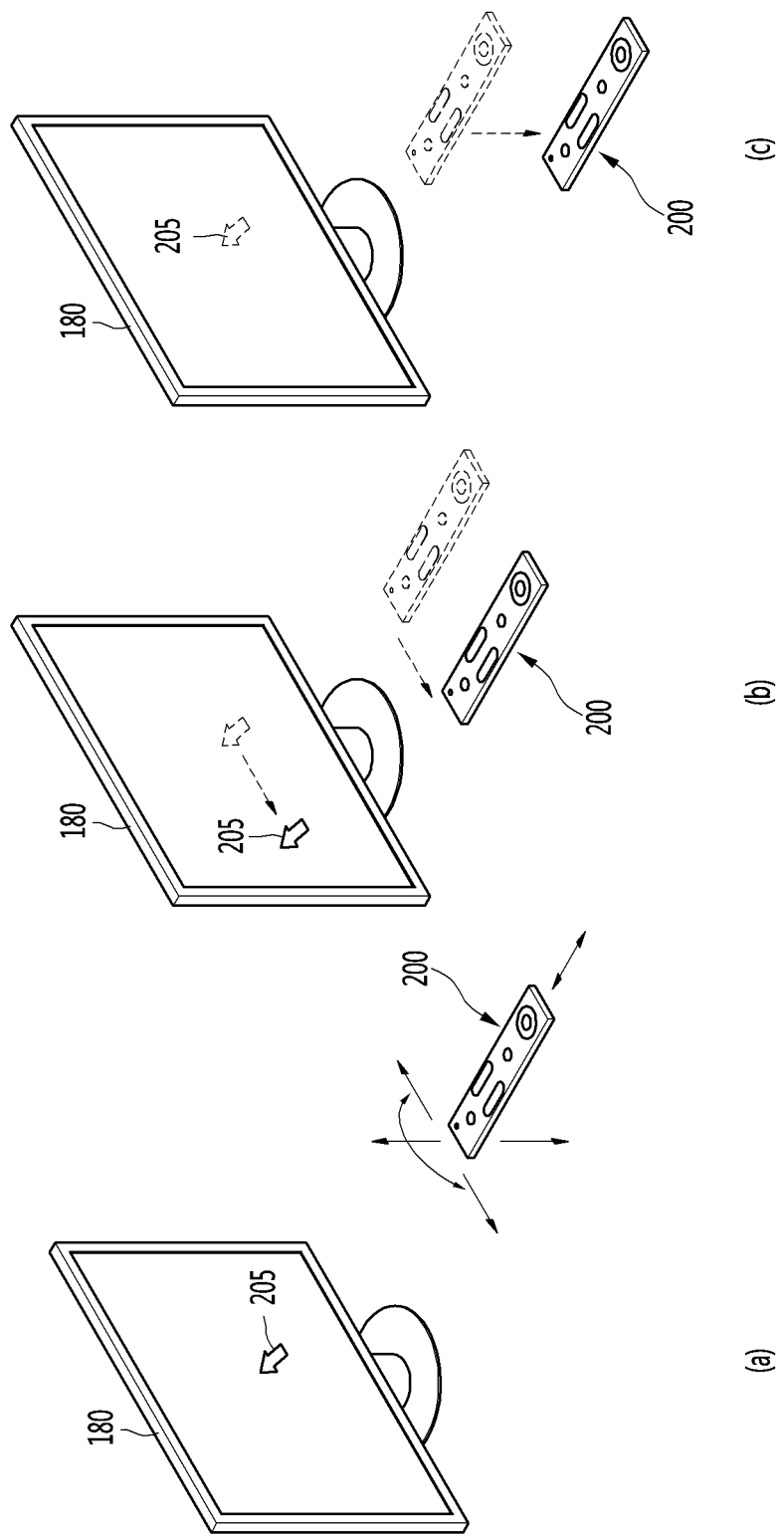
FIG. 4 is a view of utilizing a remote control device according to an embodiment of the present invention.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Then, a configuration of a mobile terminal according to an embodiment of the present invention will be described with reference to FIG. 5.

Figure 5:
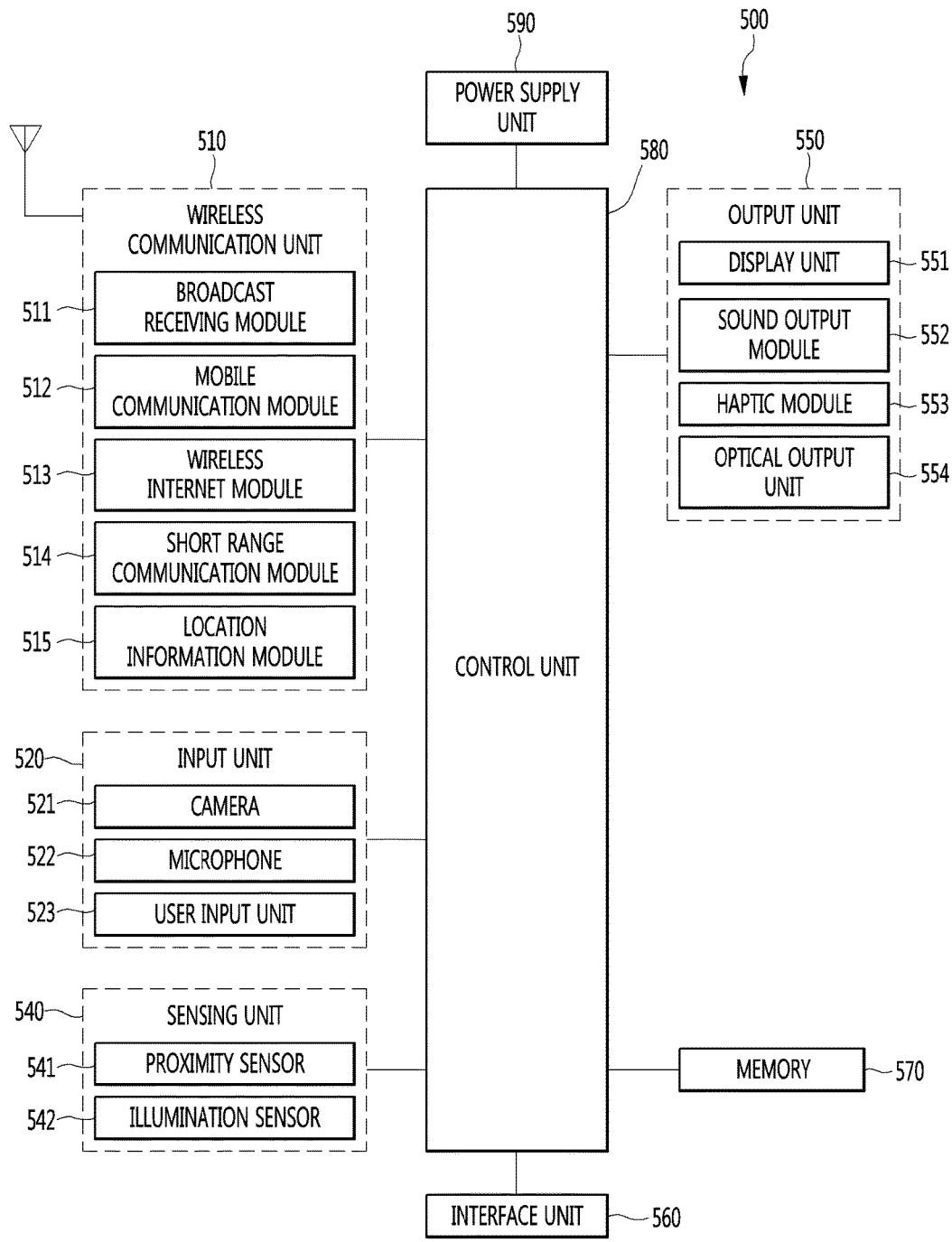
FIG. 5 is a block diagram illustrating a mobile terminal according to an embodiment of the present invention.

FIG. 5 is a block diagram illustrating a mobile terminal according to an embodiment of the present invention.

The mobile terminal 500 can include a wireless communication unit 510, an input unit 520, the sensing unit 540, an output unit 550, an interface unit 560, the memory 570, a control unit 580, and a power supply unit 590. In implementing a mobile terminal, components shown in FIG. 5 are not necessary, so that a mobile terminal described in this specification can include components less or more than the components listed above.

In more detail, the wireless communication unit 510 in the components can include at least one module allowing wireless communication between the mobile terminal 500 and a wireless communication system, between the mobile terminal 500 and another mobile terminal 500, or between the mobile terminal 500 and an external server. Additionally, the wireless communication unit 510 can include at least one module connecting the mobile terminal 500 to at least one network.

The wireless communication unit 510 can include at least one of a broadcast receiving module 511, a mobile communication module 512, a wireless internet module 513, a short-range communication module 514, and a location information module 515.

The input unit 520 can include a camera 521 or an image input unit for image signal input, a microphone 522 or an audio input unit for receiving audio signal input, and a user input unit 523 (for example, a touch key and a mechanical key)) for receiving information from a user. Voice data or image data collected by the input unit 520 are analyzed and processed as a user's control command.

The sensing unit 540 can include at least one sensor for sensing at least one of information in a mobile terminal, environmental information around a mobile terminal, and user information. For example, the sensing unit 540 can include at least one of a proximity sensor 541, an illumination sensor 542, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a mobile terminal disclosed in this specification can combines information sensed by at least two or more sensors among such sensors and can then utilize it.

The output unit 550 is used to generate a visual, auditory, or haptic output and can include at least one of a display unit 551, a sound output unit 552, a haptic module 553, and an optical output unit 554. The display unit 551 can be formed with a mutual layer structure with a touch sensor or formed integrally, so that a touch screen can be implemented. Such a touch screen can serve as the user input unit 523 providing an input interface between the mobile terminal 500 and a user and an output interface between the mobile terminal 500 and a user at the same time.

The interface unit 560 can serve as a path to various kinds of external devices connected to the mobile terminal 500. The interface unit 560 can include at least one of a wired/wireless headset port, an external charger port, a wired/wireless data port, a memory card port, a port connecting a device equipped with an identification module, an audio Input/Output (I/O) port, a video I/O port, and an earphone port. In correspondence to that an external device is connected to the interface unit 560, the mobile terminal 500 can perform an appropriate control relating to the connected external device.

Additionally, the memory 570 can store data supporting various functions of the mobile terminal 500. The memory 570 can store a plurality of application programs (for example, application programs or applications) running on the mobile terminal 500 and also data and commands for operations of the mobile terminal 500. At least part of such an application program can be downloaded from an external server through a wireless communication. Additionally, at least part of such an application program can be included in the mobile terminal 500 from the time of shipment in order to perform a basic function (for example, an incoming call, a transmission function, and a message reception) of the mobile terminal 500. Moreover, an application program can be stored in the memory 570 and installed on the mobile terminal 500, so that it can run to perform an operation (or a function) of the mobile terminal 100 by the control unit 580.

The control unit 580 can control overall operations of the mobile terminal 500 generally besides an operation relating to the application program. The control unit 580 can provide appropriate information or functions to a user or process them by processing signals, data, and information inputted/outputted through the above components or executing application programs stored in the memory 570.

Additionally, in order to execute an application program stored in the memory 570, the control unit 580 can control at least part of the components shown in FIG. 5. Furthermore, in order to execute the application program, the control unit 580 can combine at least two of the components in the mobile terminal 500 and can then operate it.

The power supply unit 590 can receive external power or internal power under a control of the control unit 580 and can then supply power to each component in the mobile terminal 500. The power supply unit 590 includes a battery and the battery can be a built-in battery or a replaceable battery.

At least part of the each component can operate cooperatively in order to implement operations, controls, or control methods of a mobile terminal 100 according to various embodiments of the present invention described below. Additionally, the operations, controls, or control methods of a mobile terminal 100 can be implemented on the mobile terminal 100 by executing at least one application program stored in the memory 570.

Hereinafter, prior to examining various embodiments implemented through the mobile terminal 500, the above-listed components are described in more detail with reference to FIG. 5.

First, in describing the wireless communication unit 510, the broadcast receiving module 510 of the wireless communication unit 511 can receive a broadcast signal and/or broadcast related information from an external broadcast management server through a broadcast channel. The broadcast channel can include a satellite channel and a terrestrial channel. At least two broadcast receiving modules for simultaneous broadcast reception for at least two broadcast channels or broadcast channel switching can be provided to the mobile terminal 100.

The mobile communication module 512 can transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal can include various types of data according to a voice call signal, a video call signal, or text/multimedia message transmission.

The wireless internet module 513 refers to a module for wireless internet access and can be built in or external to the mobile terminal 500. The wireless internet module 513 can be configured to transmit/receive a wireless signal in a communication network according to wireless internet technologies.

The wireless internet technology can include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 513 transmits/receives data according at least one wireless internet technology including internet technology not listed above.

From the viewpoint that wireless internet access by WiBro, HSDPA, HSUPA, GSM, CDMA, WCDMA, LTE, and LTE-A is achieved through a mobile communication network, the wireless internet module 513 performing wireless internet access through the mobile communication network can be understood as one type of the mobile communication module 512.

The short-range communication module 514 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication module 514 can support wireless communication between the mobile terminal 500 and a wireless communication system, between the mobile terminal 500 and another mobile terminal 500, or between networks including the mobile terminal 500 and another mobile terminal 100 (or an external server) through wireless area networks. The wireless area networks can be wireless personal area networks.

Here, the other mobile terminal 500 can be a wearable device (for example, a smart watch, a smart glass, and an HMD) that is capable of exchanging data (or interworking) with the mobile terminal 500. The short-range communication module 514 can detect (or recognize) a wearable device around the mobile terminal 500, which is capable of communicating with the mobile terminal 500 Furthermore, if the detected wearable device is a device authenticated to communicate with the mobile terminal 500, the control unit 580 can transmit at least part of data processed in the mobile terminal 500 to the wearable device through the short-range communication module 514. Accordingly, a user of the wearable device can use the data processed in the mobile terminal 500 through the wearable device. For example, according thereto, if a call is received by the mobile terminal 500, a user can perform a phone call through the wearable device or if a message is received by the mobile terminal 500, a user can check the received message.

The location information module 515 is a module for obtaining the location (or the current location) of a mobile terminal and its representative examples include a global positioning system (GPS) module or a Wi-Fi module. For example, the mobile terminal can obtain its position by using a signal transmitted from a GPS satellite through the GPS module. As another example, the mobile terminal can obtain its position based on information of a wireless access point (AP) transmitting/receiving a wireless signal to/from the Wi-Fi module, through the Wi-Fi module. If necessary, the position information module 115 can perform a function of another module in the wireless communication unit 510 in order to obtain data on the location of the mobile terminal substitutionally or additionally. The location information module 115 is a module for obtaining the position (or the current position) of the mobile terminal and is not limited to a module directly calculating and obtaining the position of the mobile terminal.

Then, the input unit 520 is used for inputting image information (or signal), audio information (or signal), data, or information inputted from a user and the mobile terminal 500 can include at least one camera 521 in order for inputting image information. The camera 521 processes image frames such as a still image or a video obtained by an image sensor in a video call mode or a capturing mode. The processed image frame can be displayed on the display unit 551 or stored in the memory 570. Moreover, a plurality of cameras 521 equipped in the mobile terminal 500 can be arranged in a matrix structure and through the camera 521 having such a matrix structure, a plurality of image information having various angles or focuses can be inputted to the input terminal 500. Additionally, the plurality of cameras 521 can be arranged in a stereo structure to obtain the left and right images for implementing a three-dimensional image.

The microphone 522 processes external sound signals as electrical voice data. The processed voice data can be utilized variously according to a function (or an application program being executed) being performed in the mobile terminal 500. Moreover, various noise canceling algorithms for removing noise occurring during the reception of external sound signals can be implemented in the microphone 522.

The user input unit 523 is to receive information from a user and if information is inputted through the user input unit 523, the control unit 580 can control an operation of the mobile terminal 500 to correspond to the inputted information. The user input unit 523 can include a mechanical input means (or a mechanical key, for example, a button, a dome switch, a jog wheel, and a jog switch at the front, back or side of the mobile terminal 500) and a touch type input means. As one example, a touch type input means can include a virtual key, a soft key, or a visual key, which is displayed on a touch screen through software processing or can include a touch key disposed at a portion other than the touch screen. Moreover, the virtual key or visual key can have various forms and can be disposed on a touch screen and for example, can include graphic, text, icon, video, or a combination thereof.

Moreover, the sensing unit 540 can sense at least one of information in a mobile terminal, environmental information around a mobile terminal, and user information and can then generate a sensing signal corresponding thereto. Based on such a sensing signal, the control unit 580 can control the drive or control of the mobile terminal 500 or can perform data processing, functions, or operations relating to an application program installed in the mobile terminal 500. Representative sensors among various sensors included in the sensing unit 540 will be described in more detail.

First, the proximity sensor 541 refers to a sensor detecting whether there is an object approaching a predetermined detection surface or whether there is an object around by using the strength of an electromagnetic field or infrared, without mechanical contact. The proximity sensor 541 can disposed in an inner area of a mobile terminal surrounded by the touch screen or around the touch screen.

Examples of the proximity sensor 541 can include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor. If the touch screen is a capacitive type, the proximity sensor 541 can be configured to detect the proximity of an object by changes in an electric field according to the proximity of the object having conductivity. In this case, the touch screen (or a touch sensor) itself can be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch". A position that an object is proximity-touched on the touch screen is a position that the object vertically corresponds to the touch screen if the object is proximity-touched. The proximity sensor 541 can detect a proximity touch and a proximity touch pattern (for example, a proximity touch distance, a proximity touch direction, a proximity touch speed, a proximity touch time, a proximity touch position, and a proximity touch movement state). Moreover, the control unit 580 processes data (for information) corresponding to a proximity touch operation and a proximity touch pattern, detected through the proximity sensor 541, and furthermore, can output visual information corresponding to the processed data on the touch screen. Furthermore, according to whether a touch for the same point on the touch screen is a proximity touch or a contact touch, the control unit 580 can control the mobile terminal 500 to process different operations or data (or information).

The touch sensor detects a touch (or a touch input) applied to the touch screen (or the display unit 551) by using at least one of various touch methods, for example, a resistive film method, a capacitive method, an infrared method, an ultrasonic method, and a magnetic field method.

For example, the touch sensor can be configured to convert a pressure applied to a specific portion of the touch screen or changes in capacitance occurring at a specific portion into electrical input signals. The touch sensor can be configured to detect a position and area that a touch target applying a touch on the touch screen touches the touch sensor, a pressured if touched, and a capacitance if touched. Here, the touch target, as an object applying a touch on the touch sensor, can be a finger, a touch pen, a stylus pen, or a pointer, for example.

In such a manner, if there is a touch input on the touch sensor, signal(s) corresponding thereto are sent to a touch controller. The touch controller processes the signal(s) and then transmits corresponding data to the control unit 580. Therefore, the control unit 580 can recognize which area of the display unit 551 is touched. Herein, the touch controller can be an additional component separated from the control unit 580 or can be the control unit 580 itself.

Moreover, the control unit 580 can perform different controls or the same control according to types of a touch target touching the touch screen (or a touch key equipped separated from the touch screen). Whether to perform different controls or the same control according to types of a touch target can be determined according to a current operation state of the mobile terminal 500 or an application program in execution.

Moreover, the above-mentioned touch sensor and proximity sensor are provided separately or combined and can thus sense various types of touches, for example, short (or tap) touch), long touch, multi touch, drag touch, flick touch, pinch-in touch, pinch-out touch, swipe touch, and hovering touch for the touch screen.

The ultrasonic sensor can recognize position information of a detection target by using ultrasonic waves. Moreover, the control unit 580 can calculate the position of a wave source through information detected by an optical sensor and a plurality of ultrasonic sensors. The position of the wave source can be calculated by using the property that light is much faster than ultrasonic wave, that is, a time that light reaches an optical signal is much shorter than a time that ultrasonic wave reaches an ultrasonic sensor. In more detail, the position of the wave source can be calculated by using a time difference with a time that ultrasonic wave reaches by using light as a reference signal.

Moreover, the camera 520 described as a configuration of the input unit 521 can include at least one of a camera sensor (for example, CCD and CMOS), a photo sensor (or an image sensor), and a laser sensor.

The camera 521 and the laser sensor can be combined to detect a touch of a detection target for a three-dimensional image. The photo sensor can be stacked on a display device and is configured to scan a movement of a detection target close to the touch screen. In more detail, the photo sensor mounts a photo diode and a transistor (TR) in a row/column and scans content disposed on the photo sensor by using an electrical signal changing according to an amount of light applied to the photo diode. That is, the photo sensor can calculate the coordinates of a detection target according to the amount of change in light and through this, can obtain the position information of the detection target.

The display unit 551 can display (output) information processed in the mobile terminal 500. For example, the display unit 551 can display execution screen information of an application program running on the mobile terminal 500 or user interface (UI) and graphic user interface (GUI) information according to such execution screen information.

Additionally, the display unit 551 can be configured as a three-dimensional display unit displaying a three-dimensional image.

A three-dimensional display method, for example, a stereoscopic method (a glasses method), an autostereoscopic (no glasses method), a projection method (a holographic method) can be applied to the three-dimensional display unit The sound output unit 552 can output audio data received from the wireless communication unit 510 or stored in the memory 570 in a call signal reception or call mode, a recording mode, a voice recognition mode, or a broadcast reception mode. The sound output unit 552 can output a sound signal relating to a function (for example, a call signal reception sound and a message reception sound) performed by the mobile terminal 500. The sound output unit 552 can include a receiver, a speaker, and a buzzer.

The haptic module 553 generates various haptic effects that a user can feel. A representative example of a haptic effect that the haptic module 553 generates is vibration. The intensity and pattern of vibration generated by the haptic module 553 can be controlled by a user's selection or a setting of a control unit. For example, the haptic module 553 can synthesize and output different vibrations or output different vibrations sequentially.

The haptic module 553 can generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 553 can be implemented to deliver a haptic effect through a direct contact and also allow a user to feel a haptic effect through a muscle sense such as a finger or an arm. The haptic module 553 can be more than two according to a configuration aspect of the mobile terminal 500.

The optical output unit 554 outputs a signal for notifying event occurrence by using light of a light source of the mobile terminal 500. An example of an event occurring in the mobile terminal 500 includes message reception, call signal reception, missed calls, alarm, schedule notification, e-mail reception, and information reception through an application.

A signal outputted from the optical output unit 554 is implemented as a mobile terminal emits single color of multi-color to the front or the back. The signal output can be terminated if a mobile terminal detects user's event confirmation.

The interface unit 560 can serve as a path to all external devices connected to the mobile terminal 500. The interface unit 560 can receive data from an external device, receive power and deliver it to each component in the mobile terminal 500, or transmit data in the mobile terminal 500 to an external device. For example, the interface unit 560 can include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the mobile terminal 500, can include a user identity module (UIM), a subscriber identity module (SIM), and a universal subscriber identity module (USIM). A device equipped with an identification module (hereinafter referred to as an identification device) can be manufactured in a smart card form. Accordingly, the identification device can be connected to the terminal 100 through the interface unit 560.

Additionally, if the mobile terminal 500 is connected to an external cradle, the interface unit 560 can become a path through which power of the cradle is supplied to the mobile terminal 500 or a path through which various command signals inputted from the cradle are delivered to the mobile terminal 500 by a user. The various command signals or the power inputted from the cradle can operate as a signal for recognizing that the mobile terminal 500 is accurately mounted on the cradle.

The memory 570 can store a program for an operation of the control unit 580 and can temporarily store input/output data (for example, a phone book, a message, a still image, and a video). The memory 570 can store data on various patterns of vibrations and sounds outputted during a touch input on the touch screen.

The memory 570 can include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 500 can operate in relation to a web storage performing a storage function of the memory 570 on internet.

Moreover, as mentioned above, the control unit 580 can control operations relating to an application program and overall operations of the mobile terminal 500 in general. For example, if a state of the mobile terminal 100 satisfies set conditions, the control unit 580 can execute or release a lock state limiting an output of a control command of a user for applications.

Additionally, the control unit 580 can perform a control or processing relating to a voice call, data communication, and a video call can perform pattern recognition processing for recognizing handwriting input or drawing input on the touch screen as a text and an image, respectively. Furthermore, the control unit 580 can use at least one or a combination of the above components to perform a control in order to implement various embodiments described below on the mobile terminal 500.

The power supply unit 590 can receive external power or internal power under a control of the control unit 580 and can then supply power necessary for an operation of each component. The power supply unit 590 includes a battery. The battery is a rechargeable built-in battery and can be detachably coupled to a terminal body in order for charging.

Additionally, the power supply unit 590 can include a connection port and the connection port can be configured as one example of the interface unit 160 to which an external charger supplying power for charging of the battery is electrically connected.

As another example, the power supply unit 590 can be configured to charge a battery through a wireless method without using the connection port. In this case, the power supply unit 590 can receive power from an external wireless power transmission device through at least one of an inductive coupling method based on a magnetic induction phenomenon, and a magnetic resonance coupling method based on an electromagnetic resonance phenomenon.

Moreover, various embodiments below can be implemented in a computer or device similar thereto readable medium by using software, hardware, or a combination thereof.

Then, a communication system using the mobile terminal 500 is described according to an embodiment of the present invention.

First, the communication system can use different wireless interfaces and/or physical layers. For example, a wireless interface available to the communication system can include Frequency Division Multiple Access (FDMA), Time Division Multiple Access (TDMA), Code Division Multiple Access (CDMA), and Universal Mobile Telecommunications Systems (UMTS) (especially, Long Term Evolution (LTE), Long Term Evolution-Advanced (LTE-A), and Global System for Mobile Communications (GSM)).

Hereinafter, for convenience of description, description is performed limited to CDMA. However, it is apparent that the present invention is applicable to all communication systems including Orthogonal Frequency Division Multiplexing (OFDM) wireless communication systems in addition to CDMA wireless communication systems.

The CDMA wireless communication system can include at least one terminal 100, at least one base station (BS) (it can be referred to as Node B or Evolved Node B), at least one base station controllers (BSCs), and a mobile switching center (MSC). MSC can be configured to be connected to Public Switched Telephone Network (PSTN) and BSCs. BSCs can be connected being paired with a BS through a backhaul line. The backhaul line can be provided according to at least one of E1/T1, ATM, IP, PPP, Frame Relay, HDSL, ADSL, and xDSL. Accordingly, a plurality of BSCs can be included in a CDMA wireless communication system.

Each of a plurality of BSs can include at least one sensor and each sensor can include an omni-directional antenna or an antenna indicating a specific radial direction from a BS. Additionally, each sensor can include at least two antennas in various forms. Each BS can be configured to support a plurality of frequency allocations and each of the plurality of frequency allocations can have a specific spectrum (for example, 1.25 MHz, 5 MHz, and so on).

The intersection of a sector and a frequency allocation can be referred to as a CDMA channel. A BS can be referred to as a Base Station Transceiver Subsystem (BTS). In such a case, one BSC and at least one BS together can be referred to as "BS". A BS can also represent "cell site". Additionally, each of a plurality of sectors for a specific BS can be referred to as a plurality of cell sites.

A Broadcasting Transmitter (BT) transmits broadcast signals to the terminals 100 operating in a system. The broadcast reception module 511 shown in FIG. 5 is provided in the terminal 100 for receiving broadcast signals transmitted from the BT.

Additionally, GPS can be linked to a CDMA wireless communication system in order to check the location of the mobile terminal 500. Then, a satellite helps obtaining the location of the mobile terminal 500. Useful location information can be obtained by at least one satellite. Herein, the location of the mobile terminal 500 can be traced by using all techniques for tracing the location in addition to GPS tracking technique. Additionally, at least one GPS satellite can be responsible for satellite DMB transmission selectively or additionally.

The location information module 515 in a mobile terminal is for detecting and calculating the position of the mobile terminal and its representative example can include a GPS module and a WiFi module. If necessary, the position information module 115 can perform a function of another module in the wireless communication unit 510 in order to obtain data on the location of the mobile terminal substitutionally or additionally.

The GPS module 115 can calculate information on a distance from at least three satellites and accurate time information and then apply triangulation to the calculated information, in order to accurately calculate the 3D current location information according to latitude, longitude, and altitude. A method for calculating location and time information by using three satellites and correcting errors of the calculated location and time information by using another one satellite is being widely used. Additionally, the GPS module 115 can speed information as continuously calculating the current location in real time. However, it is difficult to accurately measure the location of a mobile terminal by using a GPS module in a shadow area of a satellite signal such as a room. Accordingly, in order to compensate for the measurement of a GPS method, a WiFi Positioning System (WPS) can be utilized.

WPS is a technique for tracking the location of the mobile terminal 500 by using a WiFi module in the mobile terminal 500 and a wireless Access Point (AP) for transmitting or receiving wireless signals to or from the WiFi module and can mean a Wireless Local Area Network (WLAN) based location measurement technique using WiFi.

A WiFi location tracking system can include a WiFi location measurement server, a mobile terminal 500, a wireless AP connected to the mobile terminal 500, and a database for storing arbitrary wireless AP information.

The mobile terminal 500 in access to a wireless AP can transmit a location information request message to a WiFi location measurement server.

The WiFi location measurement server extracts information of a wireless AP connected to the mobile terminal 500 based on a location information request message (or signal)

of the mobile terminal 500. Information of a wireless AP connected to the mobile terminal 500 can be transmitted to the WiFi location measurement server through the mobile terminal 500 or can be transmitted from a wireless AP to a WiFi location measurement server.

Based on the location information request message of the mobile terminal 500, the extracted information of a wireless AP can be at least one of MAC Address, Service Set Identification (SSID), Received Signal Strength Indicator (RSSI), Reference Signal Received Power (RSRP), Reference Signal Received Quality (RSRQ), channel information, Privacy, Network Type, Signal Strength, and Noise Strength.

As mentioned above, the WiFi position measurement server can extract wireless AP information corresponding to a wireless AP that the mobile terminal 500 access from a pre-established database by using information of the wireless AP connected to the mobile terminal 100. At this point, information of arbitrary wireless APs stored in the database can information such as MAC Address, SSID, channel information, Privacy, Network Type, latitude and longitude coordinates of a wireless AP, a building name where a wireless AP is located, the number of floors, indoor detailed location (GPS coordinates available), the address of the owner of an AP, and phone numbers. At this point, in order to remove a mobile AP or a wireless AP provided using illegal MAC address during a measurement process, a WiFi location measurement server can extract only a predetermined number of wireless AP information in high RSSI order.

Then, the WiFi location measurement server can extract (or analyze) the location information of the mobile terminal 500 by using at least one wireless AP information extracted from the database. By comparing the included information and the received wireless AP information, location information of the mobile terminal 500 is extracted (or analyzed).

As a method of extracting (or analyzing) the location information of the motile terminal 500, a Cell-ID method, a finger-print method, a triangulation method, and a landmark method can be used.

The Cell-ID method is a method for determining the location of a wireless AP having the strongest signal intensity in neighbor wireless AP information that a mobile terminal collects as the location of the mobile terminal. Implementation is simple, no additional cost is required, and location information is obtained quickly but if the installation density of wireless APs is low, measurement precision is poor.

The finger-print method is a method for collecting signal intensity information by selecting a reference location from a service area and estimating the location through signal intensity information transmitted from a mobile terminal based on the collected information. In order to use the finger-print method, there is a need to provide a database for storing propagation characteristics in advance.

The triangulation method is a method for calculating the location of a mobile terminal based on a distance between coordinates of at least three wireless APs and a mobile terminal. In order to measure a distance between a mobile terminal and a wireless AP, a signal intensity converted into distance information, Time of Arrival (ToA), Time Difference of Arrival (TDoA), and Angle of Arrival (AoA) can be used.

The landmark method is a method for measuring the location of a mobile terminal by using a landmark transmitter knowing the location.

In addition to the listed methods, a variety of algorithms can be utilized as methods for extracting (or analyzing) the location information of a mobile terminal.

As the extracted location information of the mobile terminal 500 is transmitted to the mobile terminal 500 through the WiFi location measurement server, the mobile terminal 500 can obtain the location information.

As connected to at least one wireless AP, the mobile terminal 500 can obtain location information. At this point, the number of wireless APs, which are required for obtaining the location information of the mobile terminal 500, can vary according to a wireless communication environment where the mobile terminal 500 is located.

Then, an operating method of a system according to an embodiment of the present invention will be described with reference to FIG. 6.

Figure 6:
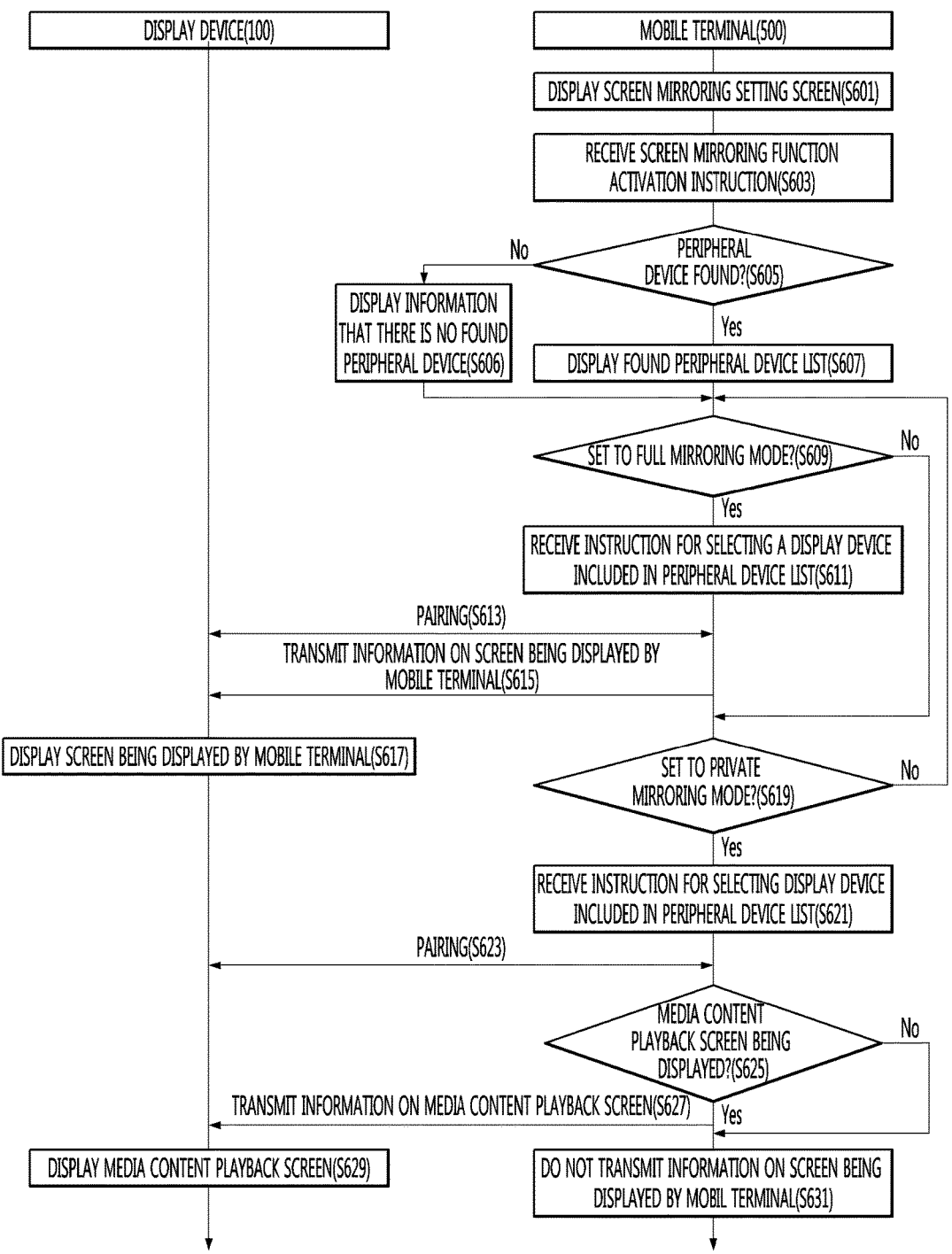
FIG. 6 is a ladder diagram illustrating an operating method of a system according to an embodiment of the present invention.

FIG. 6 is a ladder diagram illustrating an operating method of a system according to an embodiment of the present invention.

Referring to FIG. 6, the control unit 580 of the mobile terminal 500 can display a screen mirroring setting screen through the display unit 551 in operation S601. The screen mirroring setting screen can be a screen for setting a screen mirroring function between the mobile terminal 500 and a peripheral device. The screen mirroring setting screen will be described with reference to FIGS. 7A to 7C.

Figure 7A:
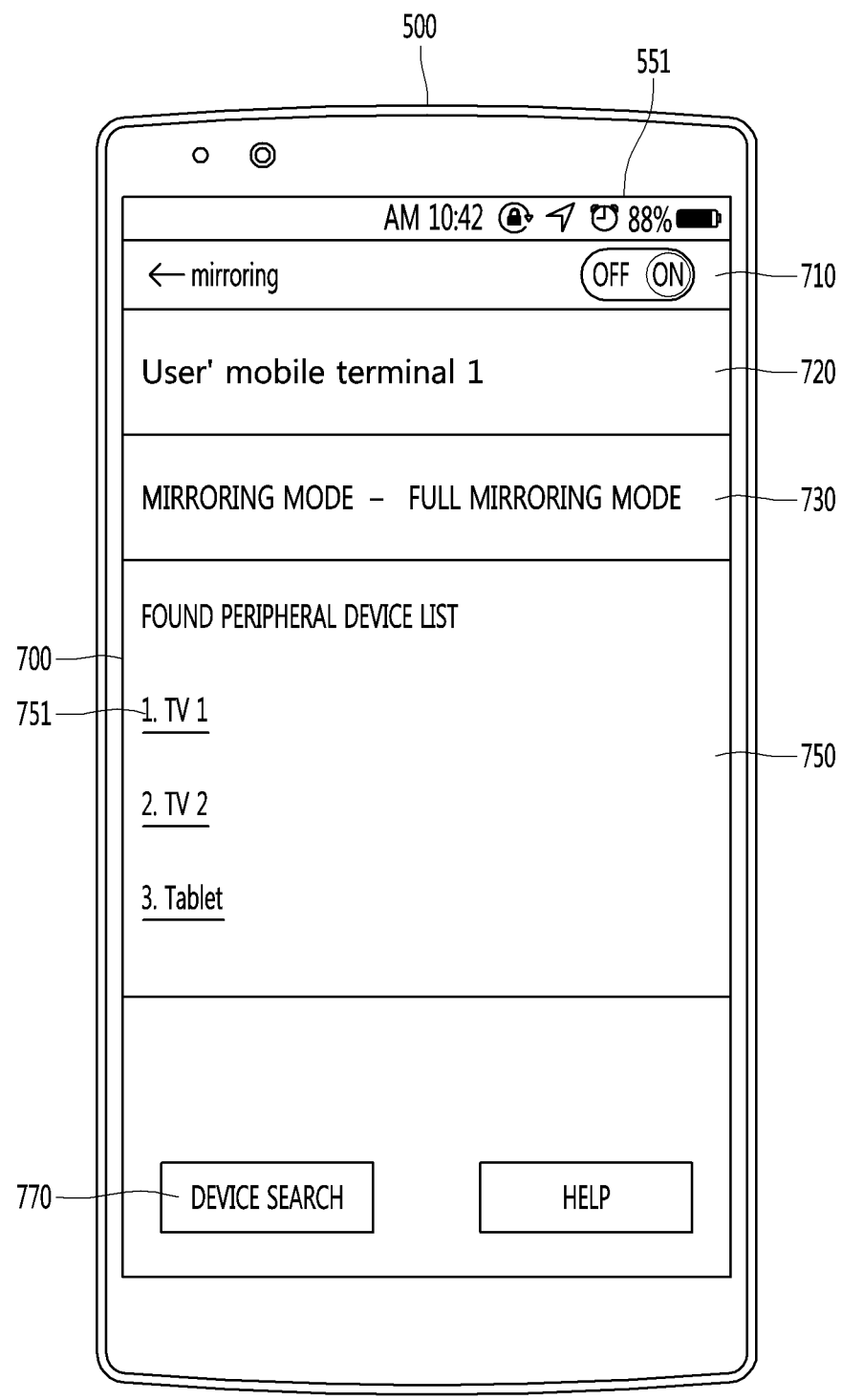
FIGS. 7A to 7C are views illustrating a screen mirroring setting screen according to an embodiment of the present invention.
Figure 7B:
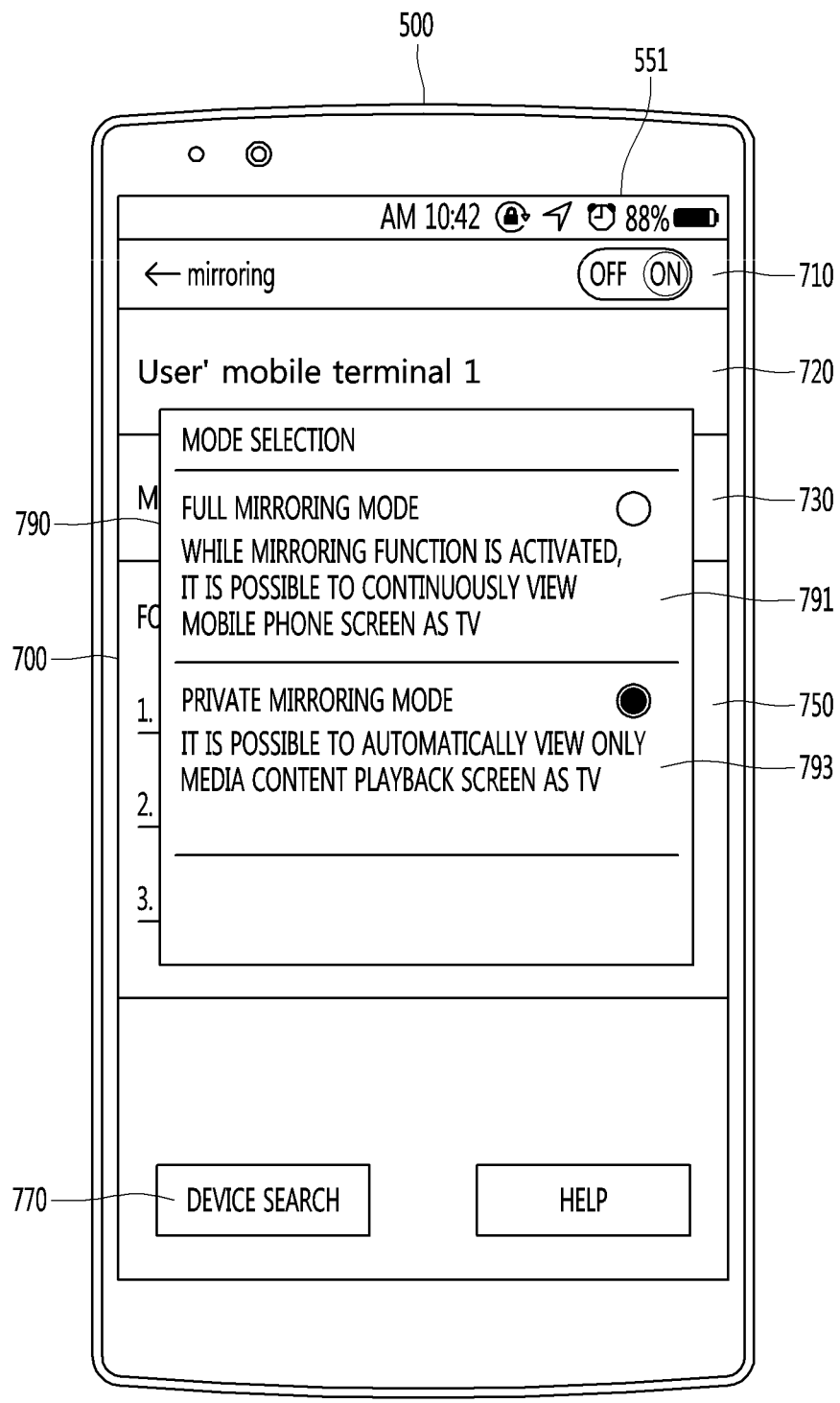
Figure 7C:
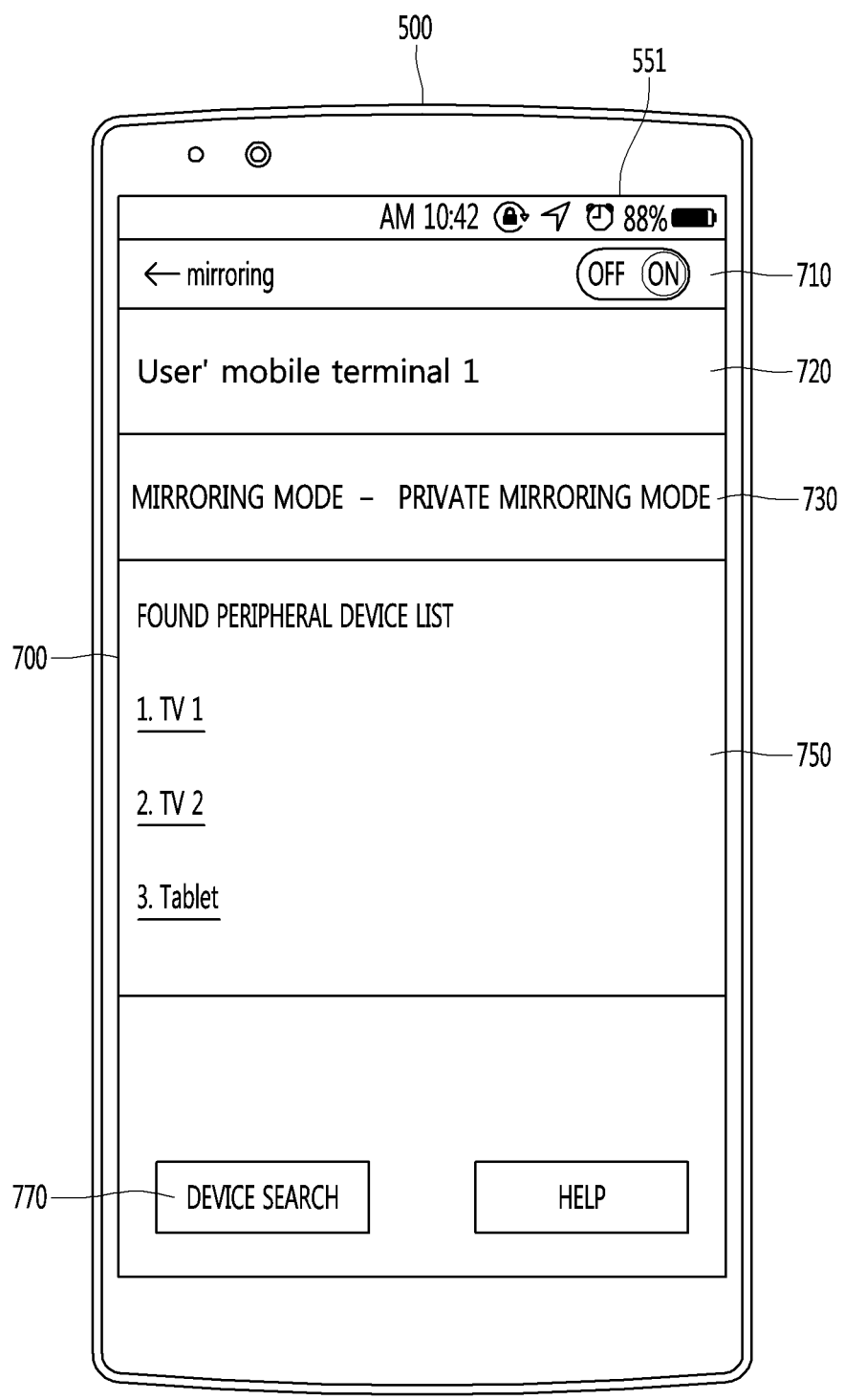

FIGS. 7A to 7C are views illustrating a screen mirroring setting screen according to an embodiment of the present invention.

Referring to FIG. 7A, the display unit 551 of the mobile terminal 500 can display a screen mirroring screen 700 for setting a screen mirroring function.

The screen mirroring screen 700 can include a mirroring activation setting item 710, an identification item 720 of the mobile terminal 500, a mirroring mode setting item 730, a search result item 750, and a device search item 770.

The mirroring activation setting item 710 can be an item for activating or deactivating a screen mirroring function. If the mirroring activation button is turned on, the screen mirroring function is activated, so that the mobile terminal 500 can be in a preparation state for performing a screen mirroring function with a peripheral device. If the mirroring activation button is turned off, the screen mirroring function can be deactivated. According to an embodiment, if the mirroring activation button is turned on, the mobile terminal 500 can search for a peripheral device available for performing a screen mirroring function.

The identification item 720 of the mobile terminal 500 can include identification information for identifying the mobile terminal 500. The identification information of the mobile terminal 500 can include user information of the mobile terminal 500, and the model and device number of the mobile terminal 500.

The mirroring mode setting item 730 can be an item for setting whether to perform a screen mirroring function based on the type of a screen that the display unit 551 of the mobile terminal 500 displays.

According to an embodiment, the mirroring mode can include a full mirroring mode and a private mirroring mode. The full mirroring mode can be a mode for performing a screen mirroring function with a peripheral device regardless of the type of a screen that the mobile terminal 500 displays. Under the full mirroring mode, a peripheral device can display a screen being displayed by the mobile terminal 500 regardless of the type of a screen being displayed by the mobile terminal 500.

The private mirroring mode can be a mode for, if a screen displayed by the mobile terminal 500 is a media content playback screen where a media content is in playback, performing a screen mirroring function with a peripheral device, and if the screen is not the media content playback screen, not performing a screen mirroring function with a peripheral device. Under the private mirroring mode, if the mobile terminal 500 displays a media content playback screen, a peripheral device can display a screen being displayed by the mobile terminal 500, and if the mobile terminal 500 does not display the media content playback screen, can not display a screen being displayed by the mobile terminal 500.

Moreover, referring to FIG. 7A, it is shown that the mirroring mode is set to the full mirroring mode. In this state, if an instruction for selecting the mirroring mode setting item 730 is received, the control unit 580 of the mobile terminal 500, as shown in FIG. 7B, can display a pop-up window 790 for selecting a mirror mode. The pop-up window 790 can include a full mirroring mode item 791 for selecting a full mirroring mode and a private mirroring mode item 793 for selecting a private mirroring mode. If the private mirroring mode item 793 is selected, the mobile terminal 500 can set the mirroring mode to the private mirroring mode. Referring to the mirroring mode setting item 730 of FIG. 7C, it is shown that the mirroring mode is set to the private mirroring mode. Again, FIG. 7A is described.

The search result item 750 can be an item for providing a search result of peripheral devices available for performing a screen mirroring function with the mobile terminal 500. If a peripheral device is found, the search result item 750, as shown in FIG. 7, can include a peripheral device list including at least one found peripheral device. If no peripheral device is found, the search result item 750 can include at least one of information for representing that no peripheral device is found, information for inducting to activate a screen mirroring function on a peripheral device, and information for inducing a dongle connection for a screen mirroring function.

The device search item 770 can be an item for searching for a peripheral device for performing a screen mirroring function with the mobile terminal 500. If the device search item 770 is selected, the mobile terminal 500 can perform the search of a peripheral device. The device search item 770 can be omitted. In this case, if a mirroring activation button included in the mirroring activation item 710 is turned on, the mobile terminal 500 can search for a peripheral device.

Operations below are described in linkage with the screen mirroring setting screen 700 described with reference to FIGS. 7A to 7C.

Again, FIG. 6 is described.

The control unit 580 of the mobile terminal 500 receives an activation instruction for activating a screen mirroring function on a screen mirroring setting screen in operation S603. According to an embodiment, the activation instruction can be received through the mirroring activation item 710 shown in FIG. 7A.

The control unit 580 of the mobile terminal 500 searches for whether there is a peripheral device available for performing a screen mirroring function with the mobile terminal 500 based on the received activation instruction in operation S605, and if a peripheral device is not found, displays information that there is no found peripheral device in operation S606. That is, as shown in FIG. 7A, information for representing that there is no found peripheral device can be displayed on the search result item 750 of the screen mirroring setting screen 700.

Moreover, if at least one peripheral device is found, the control unit 580 of the mobile terminal 500 displays a peripheral list including at least one found peripheral device through the display unit 551 in operation S607. That is, as shown in FIG. 7, information on at least one found peripheral device can be displayed on the search result item 750 of the screen mirroring setting screen 700.

The control unit 580 of the mobile terminal 500 checks whether the mirroring mode is set to the full mirroring mode in operation S609.

If the mirroring mode is set to the full mirroring mode, the control unit 580 of the mobile terminal 500 receives an instruction for selecting the display device 100 included in a peripheral device list in operation S611. According to the received instruction, the mobile terminal 500 is paired with the selected display device 100 in operation S613, and the control unit 580 of the mobile terminal 500 transmits information on a screen being displayed by the mobile terminal 500 to the selected display device 100 through the short-range communication module 514 in operation S615.

The control unit 170 of the display device 100 can display the screen being displayed by the mobile terminal 500 through the display unit 150 based on information on the screen received from the mobile terminal 500.

Operations S609 to S617 will be described with reference to the drawings.

Figure 8A:
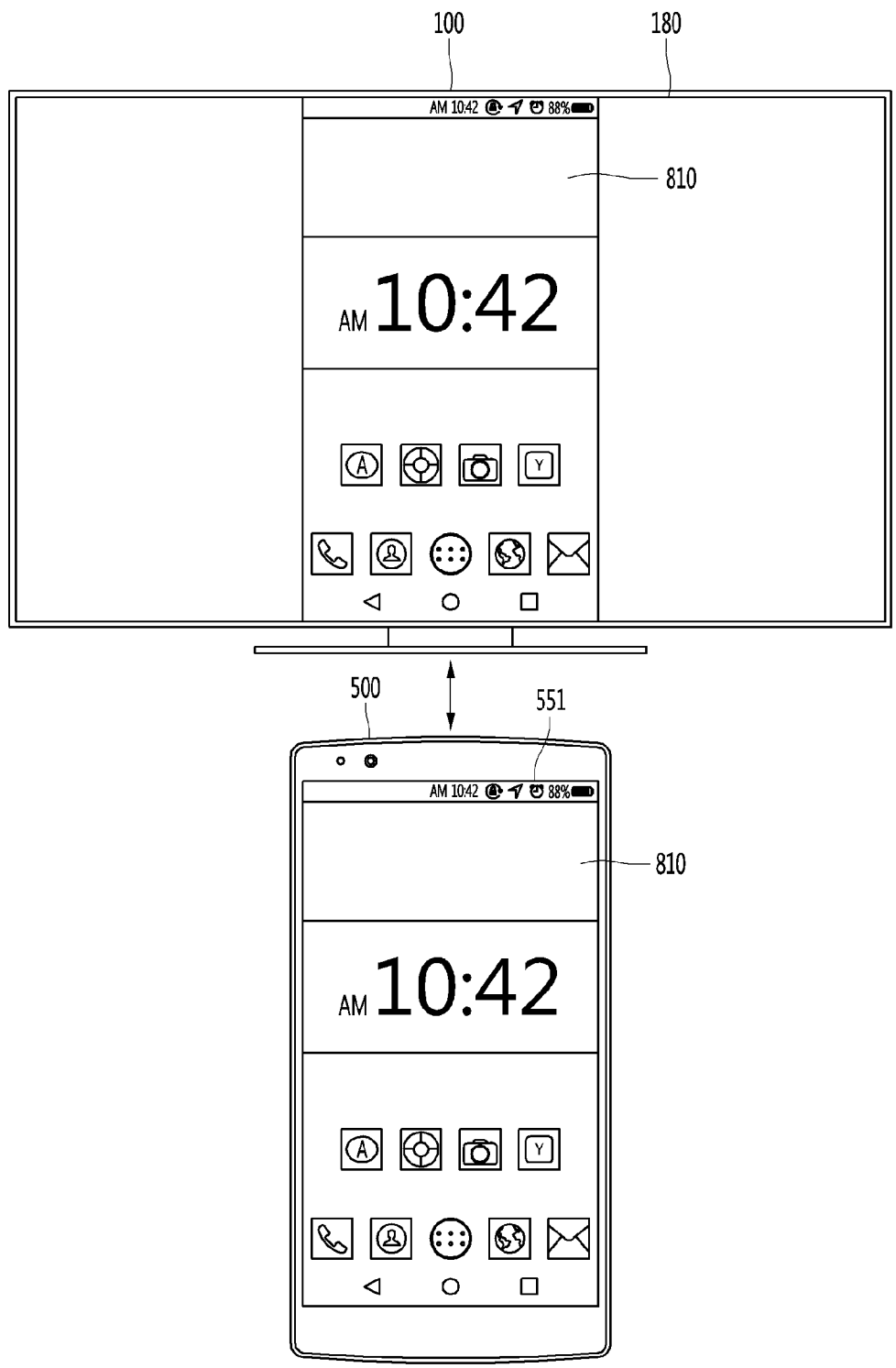
Figure 8C:
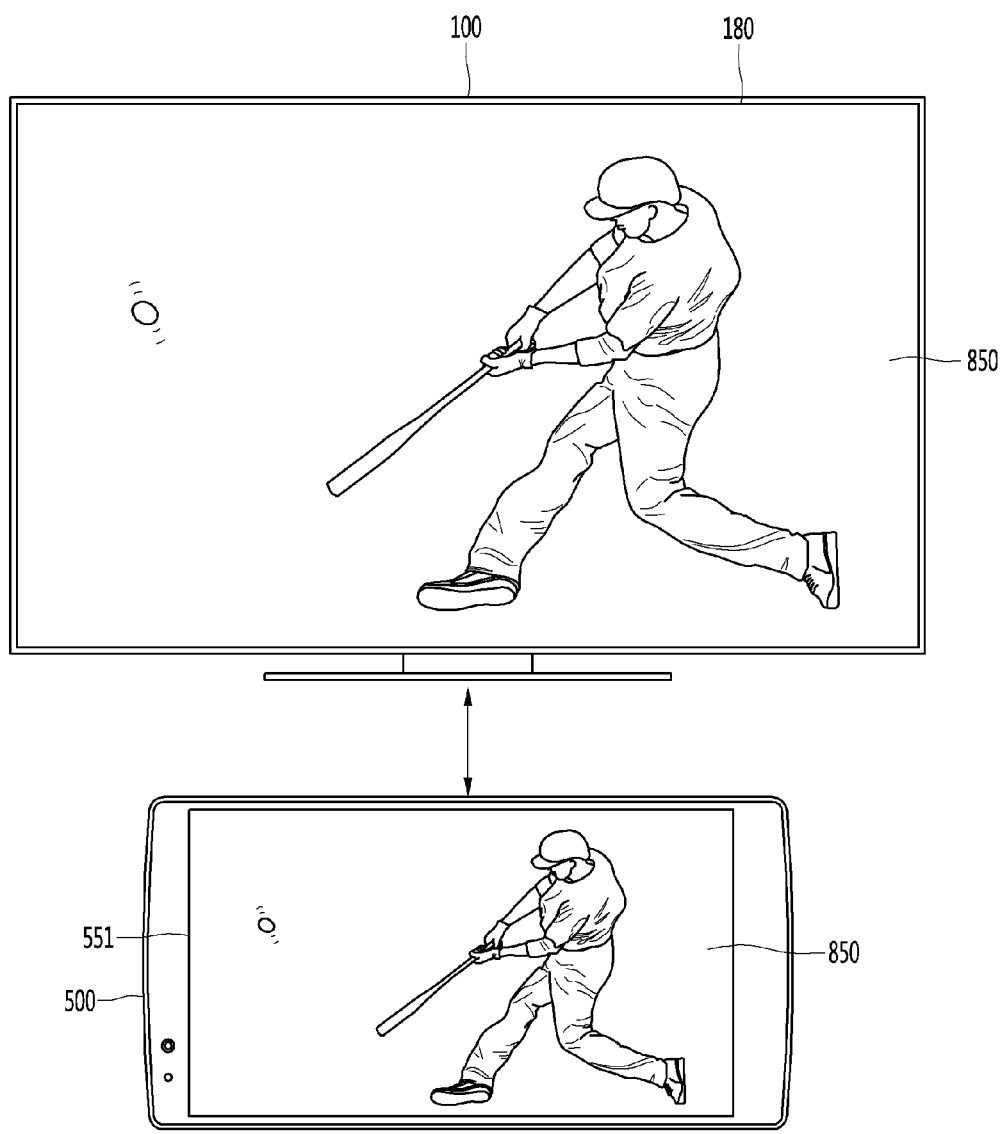

FIGS. 8A to 8C are views illustrating a process that a display device and a mobile terminal perform a screen mirroring function under a total mirroring mode according to an embodiment of the present invention.

That is, it is assumed in FIGS. 8A to 8C that a screen mirroring function is activated and the mirroring mode of the mobile terminal 500 is set to a full mirroring mode for allowing the display device 100 to display a screen being displayed by the mobile terminal 500 as it is.

Additionally, referring to FIG. 8A, a home screen 810 being displayed by the mobile terminal 500 or an execution screen 830 of an internet application can be a screen that is displayed before the display of the screen mirroring setting screen 700.

Referring to FIG. 8A, the short-range communication module 514 of the mobile terminal 500 and the wireless communication unit 173 of the display device 100 share the display screen through a screen mirroring function. That is, the display unit 551 of the mobile terminal 500 can display the home screen 810 and the control unit 580 can transmit information on a home screen being displayed to the display device 100. The display device 100 can display the home screen 810 being displayed by the mobile terminal 500 through the display unit 180 based on the information on the home screen 810 received from the mobile terminal 500. Although described later, if the mirroring mode is a private mirroring mode, the display device 100 can not display the home screen of the mobile terminal 500.

Referring to FIG. 8B, the display unit 551 of the mobile terminal 500 can display the execution screen 830 of an internet application. The execution screen 830 of the internet application can be a content browsing screen for browsing content. The execution screen 830 of the internet application can display an image 831 corresponding to a playback available video. The image 831 can be a thumbnail image of video. Since the mirroring mode is the total mirroring mode, the display device 100 can display the execution screen 830 of the internet application through the display unit 180 based on information on the execution screen 830 of the internet application received from the mobile terminal 830.

Referring to FIG. 8C, the control unit 580 of the mobile terminal 500 can play a video currently and display the video 850 in playback through the display unit 531. Since the mirroring mode is the total mirroring mode, the mobile terminal 500 can transmit the video 850 to the display device 100.

The display device 100 can display the video being displayed by the mobile terminal 500 through the display unit 180. The video 850 can be an image corresponding to an image 831 shown in FIG. 8B.

In such a way, if the mirroring mode is the total mirroring mode, the display device 100 can display a screen being displayed by the mobile terminal 500 regardless of the type of a screen being displayed by the mobile terminal 500.

Again, FIG. 6 is described.

Moreover, if the mirroring mode is set to the private mirroring mode in operation 5619, the control unit 580 receives an instruction for selecting the display device 100 included in a peripheral device list in operation 5621. According to the received instruction, the mobile terminal 500 is paired with the selected display device 100 in operation 5623.

Then, the control unit 580 of the mobile terminal 500 checks whether a media content playback screen that is a screen in a state of playing media content is displayed through the display unit 580 in operation 5625. According to an embodiment, the media content playback screen can represent a screen that the mobile terminal 500 plays one of video and picture through the display unit 551. As one example, the media content playback screen can represent a screen in a state of displaying video or picture on the entire area of the display unit 551.

If the mobile terminal 500 displays a media content playback screen, the control unit 580 of the mobile terminal 500 transmits information on the media content playback screen to the display device 100 in operation 5627.

The control unit 170 of the display device 100 can display the media content playback screen through the display unit 180 in operation 5629 based on information on the media content playback screen received from the mobile terminal 500.

If the mobile terminal 500 does not display a media content playback screen, the control unit 580 of the mobile terminal 500 does not transmit information on the screen being displayed by the mobile terminal 500 to the display device 100 in operation 5631.

Operations 5619 to 5631 will be described with reference to the drawings.

FIGS. 9A to 9F are views of performing or not performing a screen mirroring function between a display device and a mobile terminal under a private mirroring mode according to an embodiment of the present invention.

That is, it is assumed in FIGS. 9A to 9F that a screen mirroring function is not activated and the mirroring mode of the mobile terminal 500 is set to a private mirroring mode for performing a screen mirroring function only if the mobile terminal 500 displays a media content playback screen.

Figure 9A:
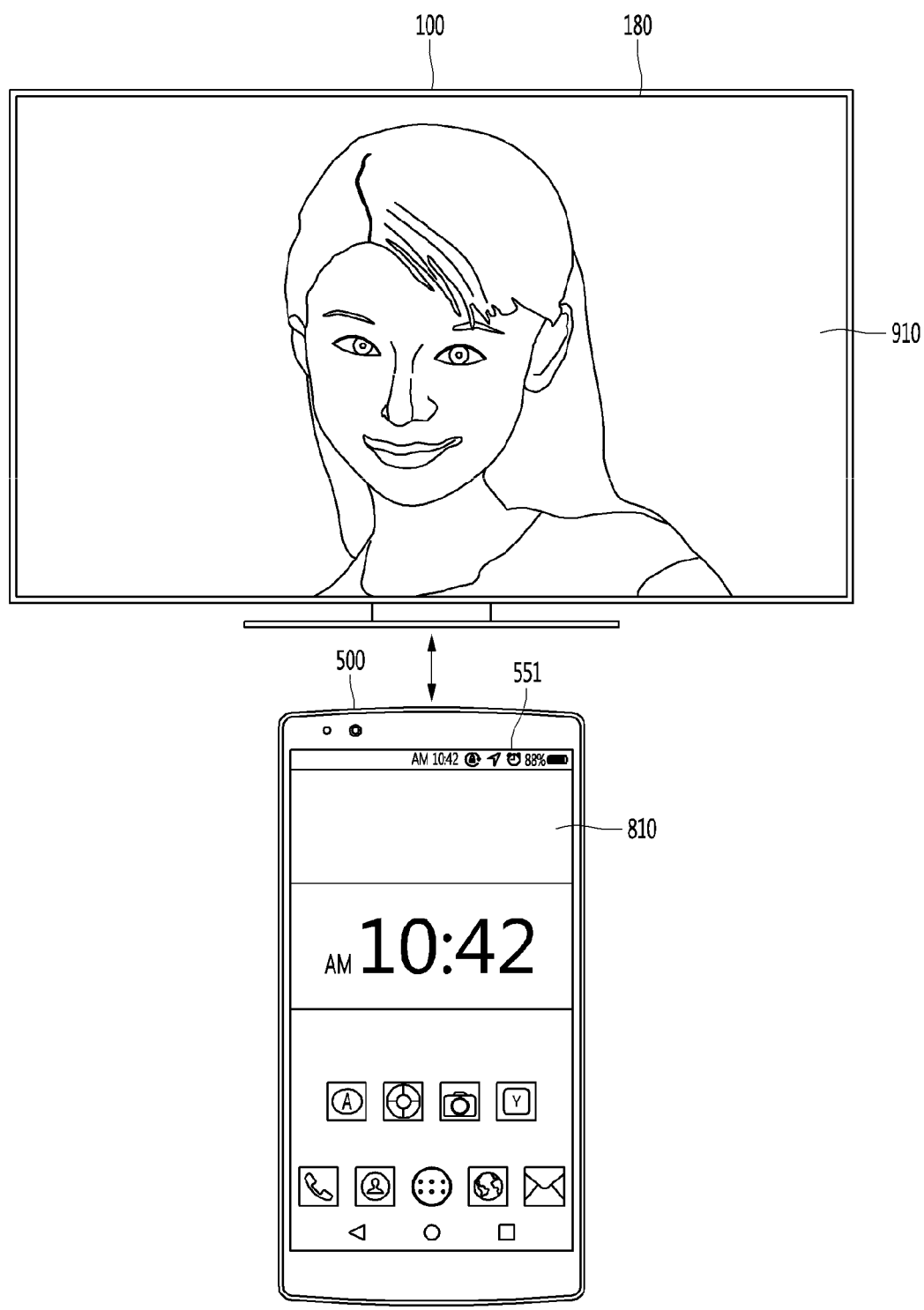
FIGS. 9A to 9F are views of performing or not performing a screen mirroring function between a display device and a mobile terminal under a private mirroring mode according to an embodiment of the present invention.

Referring to FIG. 9A, the display unit 551 of the mobile terminal 500 displays a home screen 810 and the display unit 180 of the display device 100 displays a broadcast program 910. The control unit 580 of the mobile terminal 500 can determine the type of a screen being displayed through the display unit 551. The control unit 580 can check that the home screen 810 is displayed and can not transmit information on the home screen 810 to the display device 100 under the private mirroring mode. That is, since the home screen 810 is not a media content playback screen, a screen mirroring function can not be performed between the display device 100 and the mobile terminal 500 under the private mirroring mode.

Figure 9B:
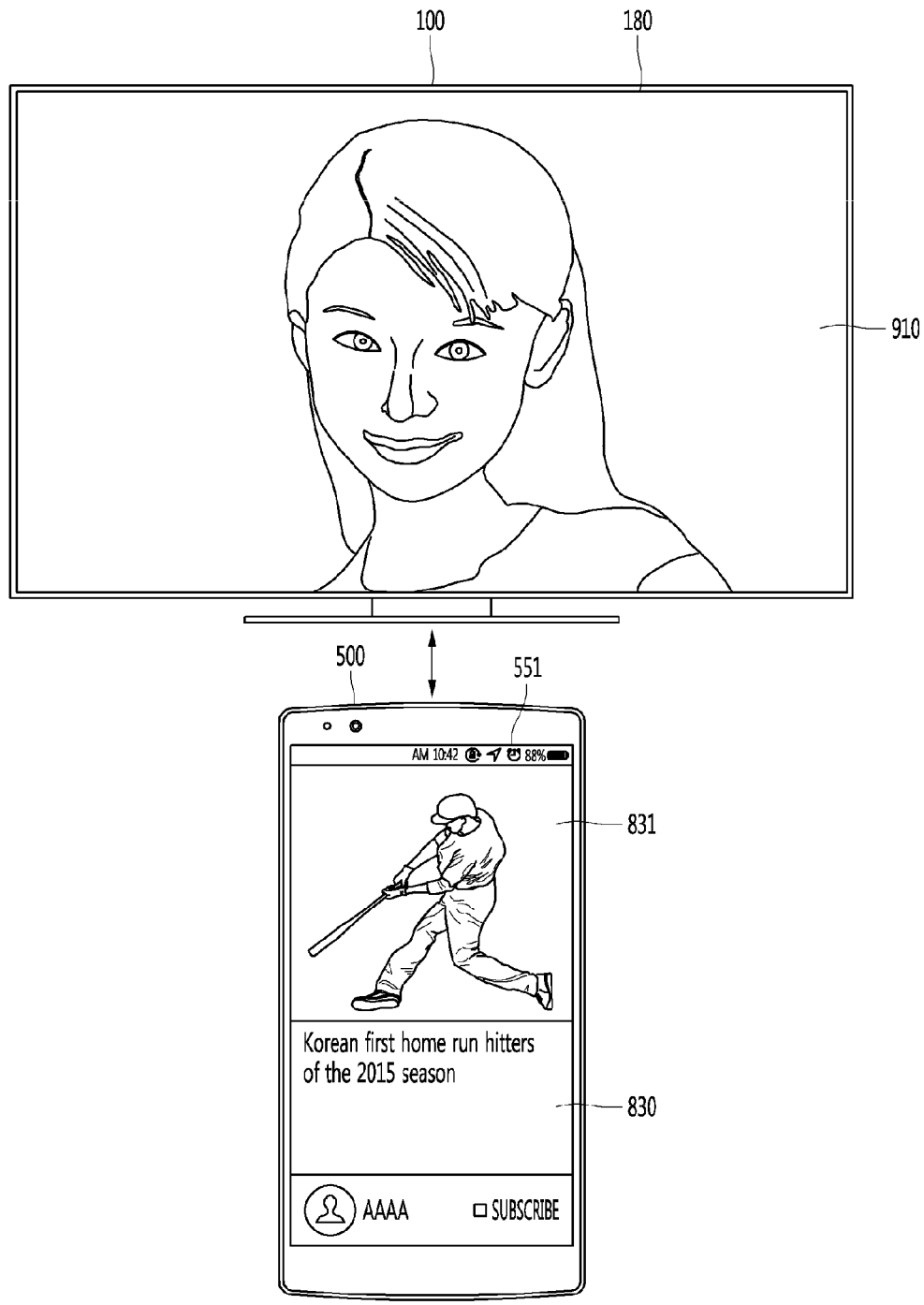

Referring to FIG. 9B, the display unit 551 of the mobile terminal 500 displays an execution screen 830 of an internet application and the display unit 180 of the display device 100 displays a broadcast program 910. The control unit 580 of the mobile terminal 500 can check that the execution screen 830 of the internet application is displayed through the display unit 551 and can not transmit information on the execution screen 830 of the internet application to the display device 100. That is, since the execution screen 830 of the internet application is not a media content playback screen, the display device 100 and the mobile terminal 500 can not perform a screen mirroring function under the private mirroring mode.

Figure 9C:
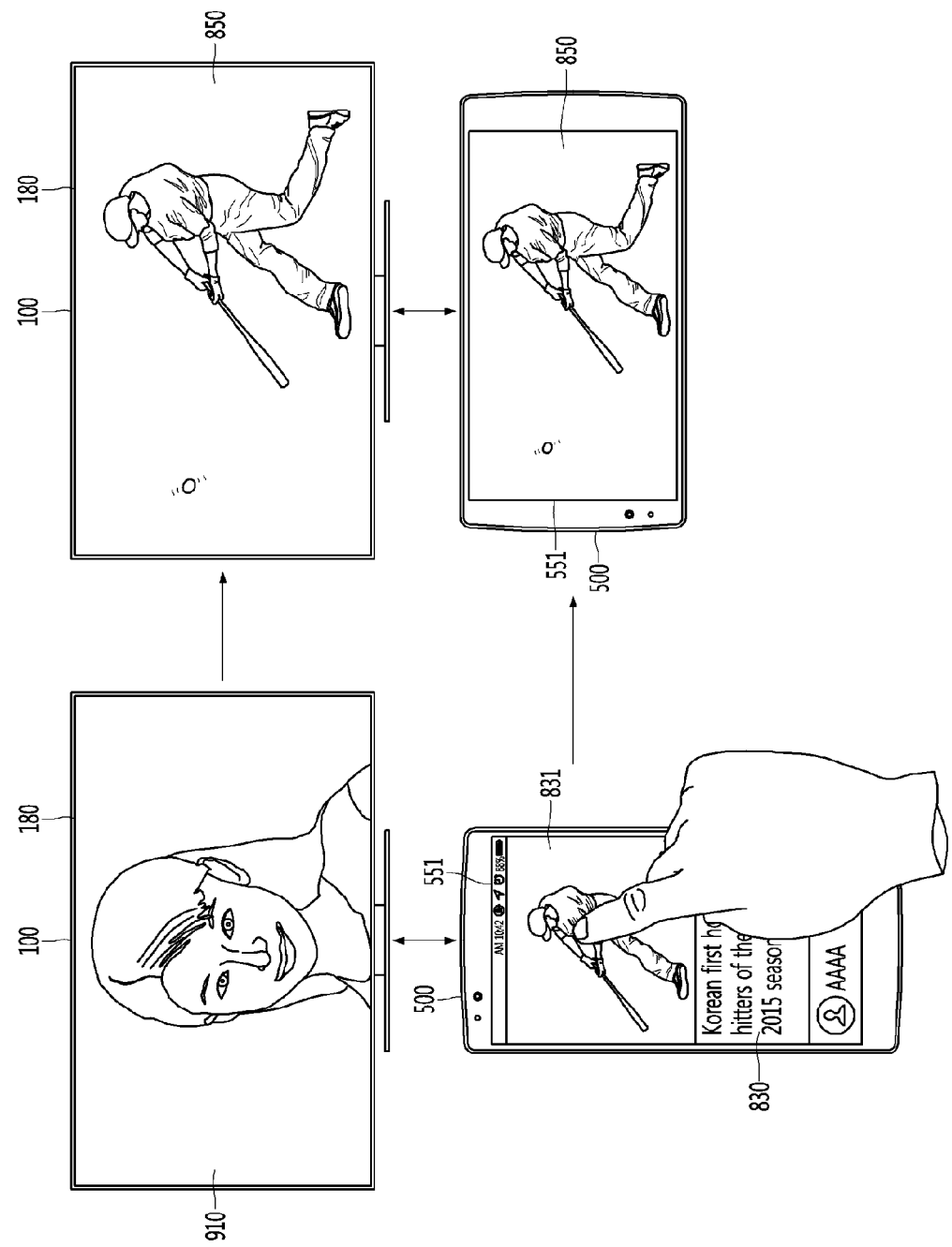

Referring to FIG. 9C, if an image 831 is selected from on the execution screen 830 of the internet application displayed through the display unit 551 of the mobile terminal 500, the mobile terminal 500 can play a video 850 corresponding to the image 831. The played video 850 can be displayed on the entire screen of the display unit 551. That is, the playback screen of a media content can be displayed through the display unit 551. If the video 850 is played through the display unit 551, the control unit 580 of the mobile terminal 500 can transmit the video 850 to the display device 100. For example, the control unit 580 of the mobile terminal 500 can transmit the video 850 to the display device 100 from a time point that a playback instruction for playing the video 850 is received.

Since a screen mirroring function is activated, the display device 100 can receive the video 850 received from the mobile terminal 500 and play it through the display unit 180. The control unit 170 of the display device 100 can switch the existing broadcast program 910 in playback to the video 850 received from the mobile terminal 500. Accordingly, the mobile terminal 500 and the display device 100 can perform a screen mirroring function normally.

In such a way, the mobile terminal 500 can transmit only the playback screen of media content to the display device 100 to perform a screen mirroring function under the private mirroring mode. Accordingly, if a screen mirroring function is activated, a screen being displayed by the mobile terminal 500 is not required to be transmitted to the display device 100 always, so that only a screen that a user wants can be mirrored and the battery of the mobile terminal 500 can not be wasted.

Figure 9D:
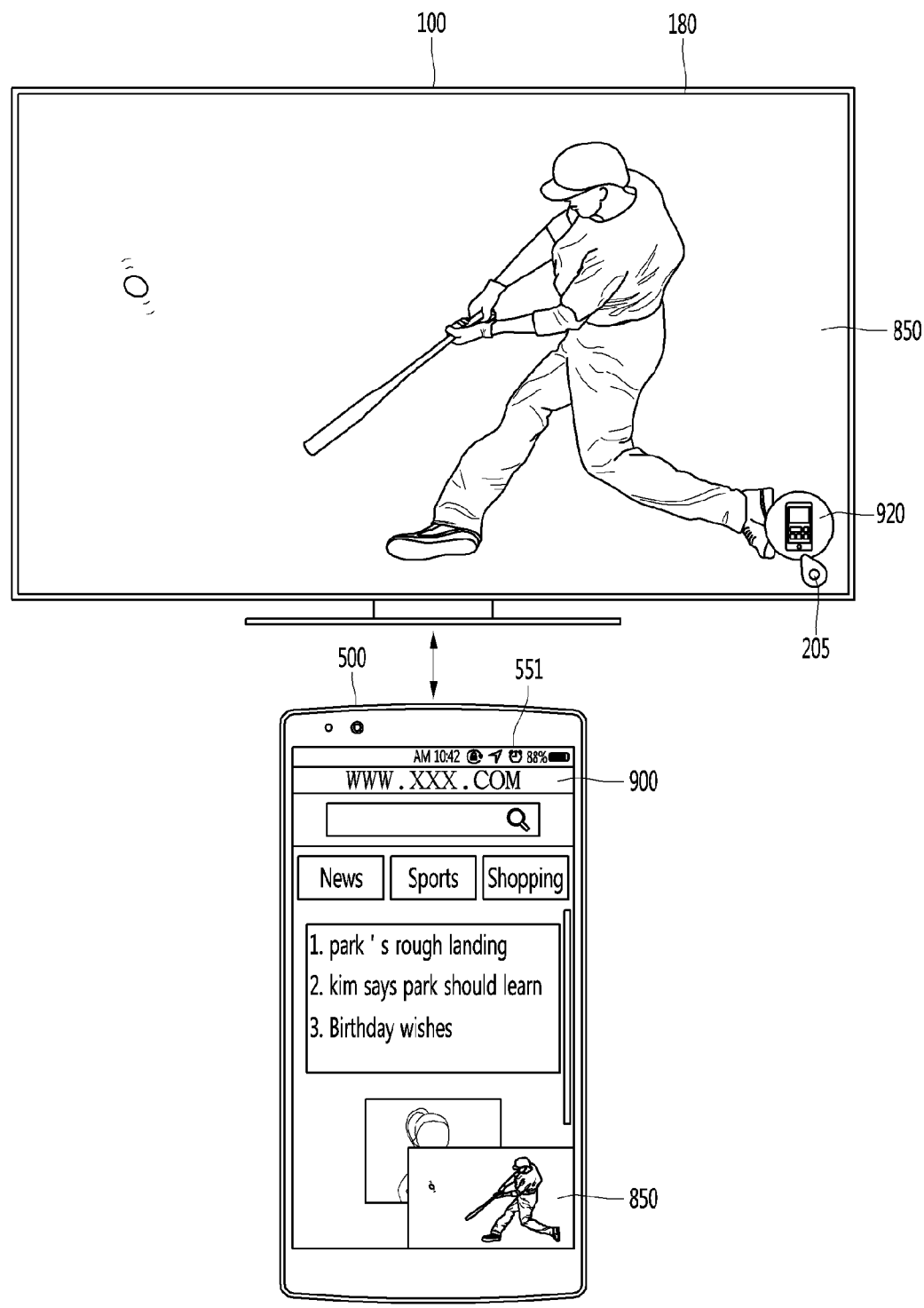

Moreover, under the private mirroring mode, a user can perform another task through the mobile terminal 500. That is, referring to FIG. 9C, in a state that the display device 100 and the mobile terminal 500 display the video 850 at the same time, the mobile terminal 500 can receive an execution instruction of an internet application. Accordingly, the mobile terminal 500, as shown in FIG. 9D, can display the internet application screen 900 through the entire screen of the display unit 551. In this case, the mobile terminal 500 can display the video 850 that is a target of screen mirroring on a partial screen instead of the entire screen of the display unit 551. That is, the video 850 that is a target of screen mirroring can be displayed on the execution screen 900 of an internet application. A user can search for necessary information through the execution screen 900 of an internet application while viewing the video 850 displayed on a partial screen of the mobile terminal 500.

Additionally, if the execution screen 900 of the internet application is displayed through the display unit 551 of the mobile terminal 500 during screen mirroring, the display device 100, as shown in FIG. 9D, can display a mirroring screen view icon 920 through the display unit 180. The mirroring screen view icon 920 can be an icon that is displayed together if the display device 100 displays the playback screen of media content under the private mirroring mode. That is, in operation 629, the media content playback screen and the mirroring screen view icon 920 can be displayed together.

Figure 9E:
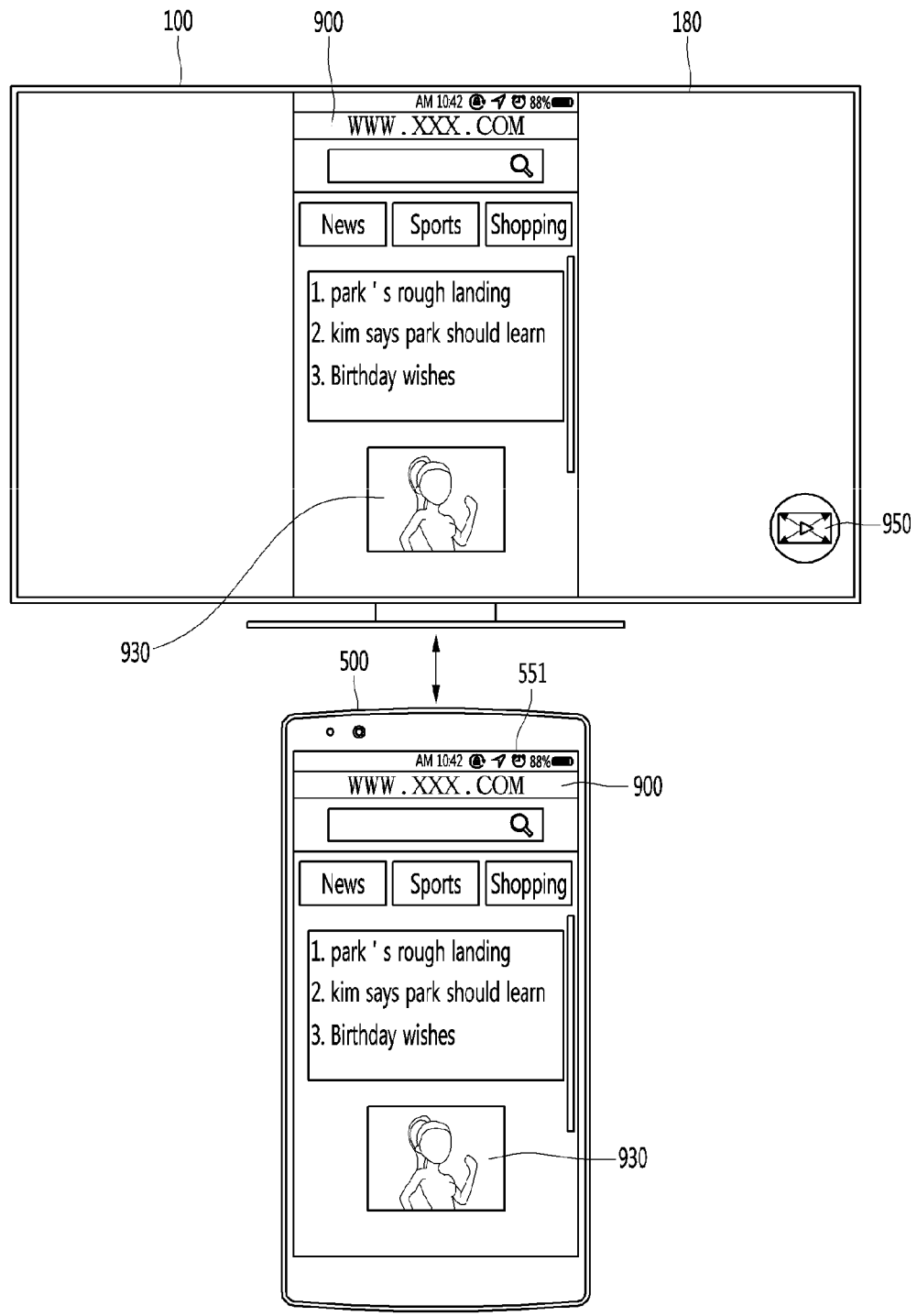

If an instruction for selecting the mirroring screen view icon 920 is received, the control unit 170 of the display device 100, as shown in FIG. 9E, can display the execution screen 900 of the internet application being displayed through the display unit 551 of the mobile terminal 500. As one example, an instruction for selecting the mirroring screen view icon 920 can be an instruction for switching the private mirroring mode to the full mirroring mode. The display device 100 can request information on a screen being displayed from the mobile terminal 500 based on the instruction for selecting the mirroring screen view icon 920 The control unit 170 of the display device 100 can stop the playback of the video 850 according to the instruction for selecting the mirroring screen view icon 920, and the mobile terminal 500 can receive and display the execution screen 900 of an internet application being displayed. The control unit 170 of the display device 100 can receive an instruction for selecting the mirroring screen view icon 920 through the pointer 205 that moves in correspondence to the movement of the remote control device 200. A user can easily search for another content by selecting the mirroring screen view icon 920 while viewing the video 850 through the screen mirroring function.

Moreover, referring to FIG. 9E, the execution screen 900 of an internet application displayed through the display unit 180 can include a media content 930. Additionally, the display unit 180 can further display a content playback screen view icon 950 for playing the media content 930 on the entire screen. The content playback screen view icon 950 can be an icon for switching the full mirroring mode to the private mirroring mode again. The content playback screen view icon 950, as described in operation 5617, can be displayed through the display unit 180 in addition to a screen being displayed by the mobile terminal 500, under to the full mirroring mode.

Figure 9F:
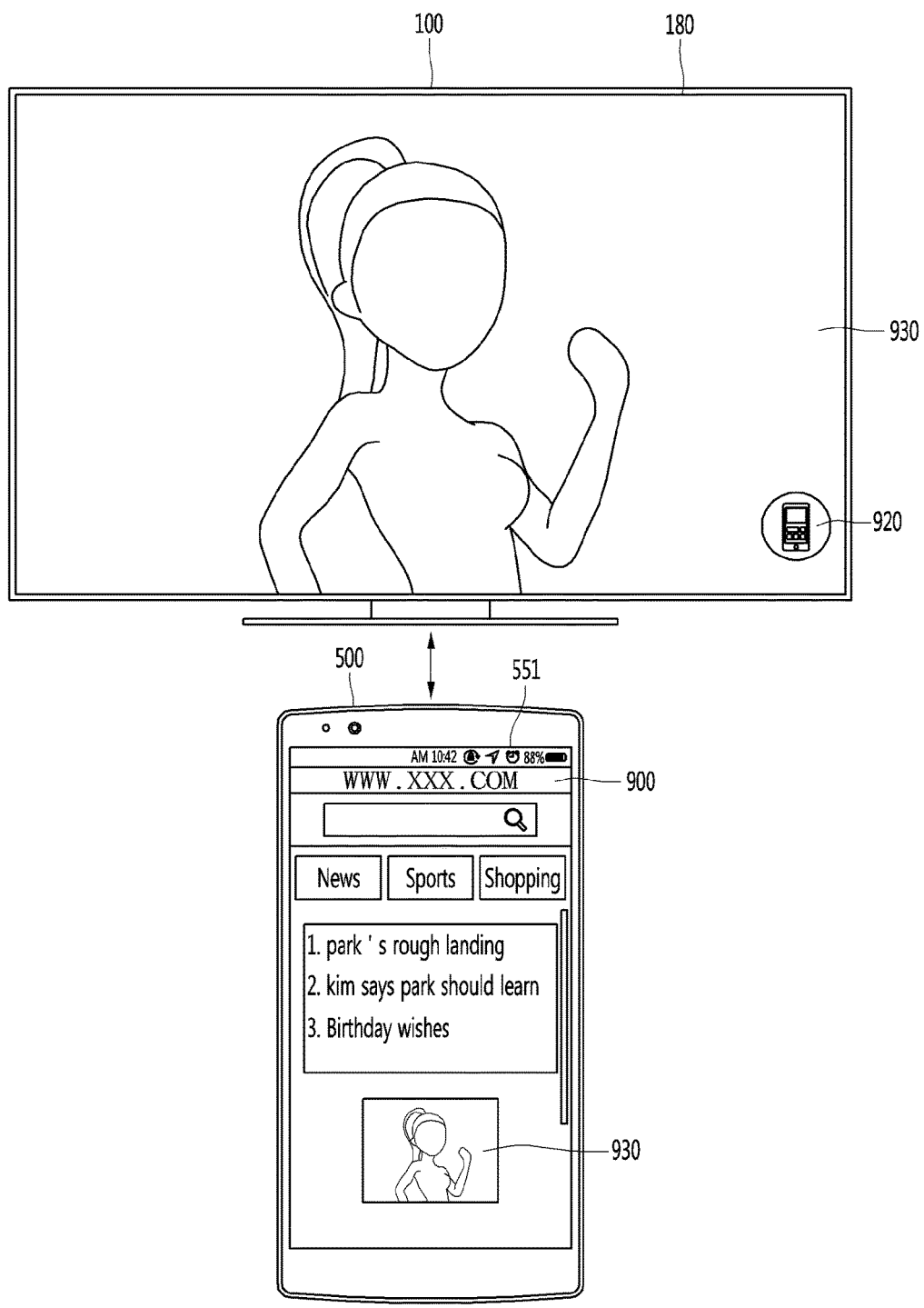

If the media content 930 displayed through the display unit 180 is selected and an instruction for selecting the content playback screen view icon 950 is received, the control unit 170 of the display device 100, as shown in FIG. 9F, can play the media content 930 on the entire screen of the display unit 180. At this point, the mobile terminal 500 can display the execution screen 900 of an internet application as it is. In such a way, the content playback screen view icon 950 can be an icon for switching to the private mirroring mode for displaying only the playback screen of media content during the performance of a screen mirroring function.

Additionally, referring to FIG. 9F, if the mirroring mode is the private mirroring mode and the display device 100 plays the media content 930 currently, the mirroring screen view icon 920 can be further displayed. The mobile terminal 500 can display the media content 930 on a partial screen while displaying the execution screen 900 of the internet application on the entire screen.

A user can easily switch a mirroring mode through the mirroring screen view icon 920 and the content playback screen view icon 950. This means that the mirroring mode can be switched through the display device 100.

Moreover, according to another embodiment of the present invention, the private mirroring mode can be divided according to the type of media content or an application to be executed.

Figure 10:
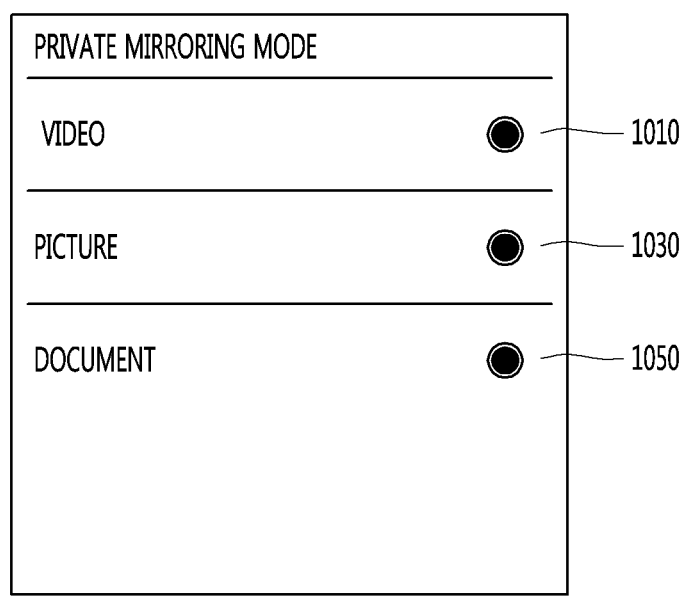
FIG. 10 is a view illustrating that a private mirroring mode is subdivided and configured according to the type of media content according to an embodiment of the present invention.
Figure 11:
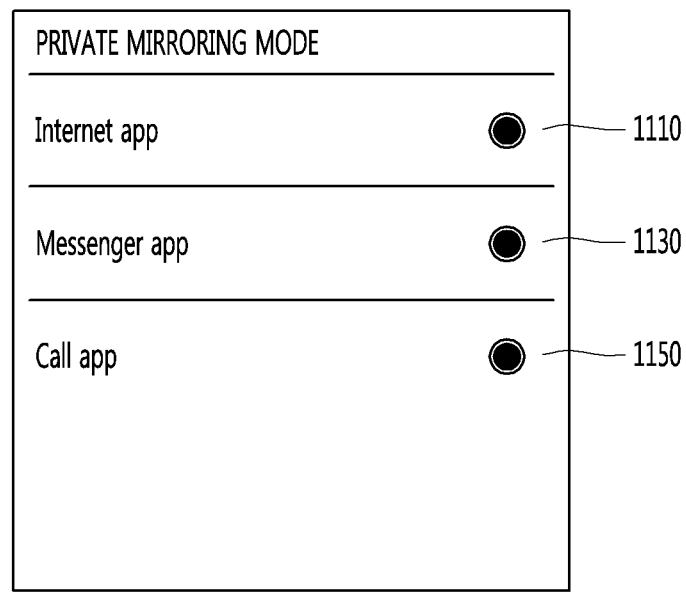
FIG. 11 is a view illustrating that a private mirroring mode is subdivided and configured according to an application according to another embodiment of the present invention.

FIG. 10 is a view illustrating that a private mirroring mode is subdivided and configured according to the type of media content according to an embodiment of the present invention, and FIG. 11 is a view illustrating that a private mirroring mode is subdivided and configured according to an application according to another embodiment of the present invention.

Referring to FIG. 10, a private mirroring subdivision window 1000 for subdividing a private mirroring mode according to the type of media content is shown. If the private mirroring mode item 793 is selected in FIG. 7B, the private mirroring subdivision window 1000 can be a window displayed though the display unit 551 of the mobile terminal 500.

The private mirroring subdivision window 1000 can include a video item 1010, a picture item 1030, and a document item 1050.

The video item 1010 can be an item set to perform a screen mirroring function with the display device 100 only if video is played in the playback screen of media content under a private mirroring mode.

The picture item 1030 can be an item set to perform a screen mirroring function with the display device 100 only if picture is displayed in the playback screen of media content under a private mirroring mode.

The document item 1050 can be an item set to perform a screen mirroring function with the display device 100 only if document is displayed in the playback screen of media content under a private mirroring mode.

At least one of the video item 1010, the picture item 1030, and the document item 1050 can be set at the same time.

A user can mirror only a desired type of content according to the type of media content.

Referring to FIG. 11, a private mirroring subdivision window 1100 for subdividing a private mirroring mode according to an application is shown.

If the private mirroring mode item 793 is selected in FIG. 7B, the private mirroring subdivision window 1100 can be a window displayed though the display unit 551 of the mobile terminal 500.

The private mirroring subdivision window 1100 can include an internet application item 1110, a video player application item 1130, and a call application item 1150.

The internet application item 1110 can be an item set to perform a screen mirroring function with the display device 100 only if the execution screen of an internet application is displayed through the display unit 551 of the mobile terminal 500.

The video player application item 1130 can be an item set to perform a screen mirroring function with the display device 100 only if the execution screen of a video application available for playing video is displayed through the display unit 551 of the mobile terminal 500.

The call application item 1150 can be an item set to perform a screen mirroring function with the display device 100 only if a call reception screen is displayed through the display unit 551 of the mobile terminal 500. However, in general, a user does not want to see a call reception screen through the display device 100 during screen mirroring, so that it is rare that the call application item 1150 is set to an activation state.

A user can set an application for screen mirroring through the private mirroring subdivision window 1100 separately.

According to various embodiments of the present invention, a user can view only desired information through a display device if performing a screen mirroring function.

Additionally, if performing a screen mirroring function, a mobile terminal does not transmit information on a screen to a display device always, so that unnecessary battery consumption can be reduced.

According to an embodiment of the present invention, the above-mentioned method can be embodied as computer readable codes on a non-transitory computer readable recording medium having a program thereon. Examples of the computer readable recording medium include ROM, RAM, CD-ROM, magnetic tape, floppy disk, and an optical data storage device and also include carrier waves (e.g., transmission through the Internet).

The above-described display device is not limited to the application of the configurations and methods of the above-described embodiments and the entire or part of the embodiments can be selectively combined and configured to allow various modifications.

What is claimed is:

1. A mobile terminal comprising:
   a display unit configured to display information;
   a short-range communication module configured to transmit information on a screen of the display unit to a display device in order to perform a screen mirroring function; and
   a control unit configured to control the display unit and the short-range communication module,
   wherein the control unit is further configured to:
   determine a type of the screen that the mobile terminal displays and a mirroring mode of the mobile terminal, wherein the mirroring mode includes a private mode and a full mirroring mode,
   transmit a media content being displayed on the display unit to the display device, if the type of the screen is a media content playback screen that plays the media content and the mirroring mode is the private mode, and
   transmit, to the display device, the information on the screen regardless of the type of the screen if the mirroring mode is the full mirroring mode,
   wherein the controller does not transmit the media content to the display device if the type of the screen is not the media content playback screen and the mirroring mode is the private mode.

2. The mobile terminal according to claim 1, wherein the type of the screen that the mobile terminal displays includes the media content playback screen, a home screen, and an execution screen of an application.

3. The mobile terminal according to claim 1, wherein the control unit displays a mirroring setting screen on the display unit, the mirroring setting screen includes a mirroring mode setting item for setting whether to perform the screen mirroring function based on the type of the screen that the display unit the mobile terminal displays.

4. The mobile terminal according to claim 3, wherein if the mirroring mode setting item is selected, the control unit displays a pop-up window including a full mirroring mode item for selecting the full mirroring mode and a private mirroring mode item for selecting the private mirroring mode.

5. A method comprising:
   displaying, by a display unit of a mobile terminal, a screen;
   determining, by a processor of the mobile terminal, a type of the screen that the mobile terminal displays and a mirroring mode of the mobile terminal, wherein the mirroring mode includes a private mode and a full mirroring mode;
   transmitting, by a short-range communication module of the mobile terminal, a media content being displayed on the display unit to a display device, in response to the type of the screen being a media content playback screen that plays the media content and the mirroring mode is the private mirroring mode, wherein the display device is separate from the mobile terminal,
   transmitting, by the short-range communication module of the mobile terminal, to the display device, the information on the screen regardless of the type of the screen in response to the mirroring mode being the full mirroring mode; and
   not transmitting the media content to the display device in response to the type of the screen not being the media content playback screen and the mirroring mode being private mode.

6. The method according to claim 5, wherein the type of the screen that the mobile terminal displays includes the media content playback screen, a home screen and an execution screen of an application.

7. The method according to claim 5, wherein the media content playback screen is a screen that plays the media content on an entire screen of the display unit.

8. The method according to claim 5, wherein the control unit displays a mirroring setting screen on the display unit, the mirroring setting screen includes a mirroring mode setting item for setting whether to perform the screen mirroring function based on the type of the screen that the display unit the mobile terminal displays.

9. The method according to claim 8, wherein if the mirroring mode setting item is selected, the control unit displays a pop-up window including a full mirroring mode item for selecting the full mirroring mode and a private mirroring mode item for selecting the private mirroring mode.

* * * * *